US 11,480,958 B2

(12) United States Patent
Paczan et al.

(10) Patent No.: US 11,480,958 B2
(45) Date of Patent: Oct. 25, 2022

(54) COLLECTIVE UNMANNED AERIAL VEHICLE CONFIGURATIONS

(71) Applicant: Amazon Technologies, Inc., Seattle, WA (US)

(72) Inventors: Nathan Michael Paczan, Seattle, WA (US); Michael John Elzinga, Woodinville, WA (US); Raphael Hsieh, Seattle, WA (US); Luan Khai Nguyen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1835 days.

(21) Appl. No.: 14/626,376

(22) Filed: Feb. 19, 2015

(65) Prior Publication Data
US 2016/0378108 A1 Dec. 29, 2016

(51) Int. Cl.
| | |
|---|---|
| *G05D 1/00* | (2006.01) |
| *B64C 37/02* | (2006.01) |
| *B64C 39/02* | (2006.01) |
| *G05D 1/10* | (2006.01) |
| *B64D 31/06* | (2006.01) |
| *G06Q 10/08* | (2012.01) |

(52) U.S. Cl.
CPC ........... *G05D 1/0027* (2013.01); *B64C 37/02* (2013.01); *B64C 39/024* (2013.01); *B64D 31/06* (2013.01); *G05D 1/104* (2013.01); *G06Q 10/083* (2013.01); *B64C 2201/108* (2013.01); *B64C 2201/128* (2013.01); *B64C 2201/143* (2013.01)

(58) Field of Classification Search
CPC .................................................... G05D 1/0027

USPC ................. 705/1.1, 7.11; 701/1, 2, 3, 4, 5, 7
See application file for complete search history.

(56) References Cited

U.S. PATENT DOCUMENTS

| | | |
|---|---|---|
| 3,295,789 A | 1/1967 | Hill |
| 8,936,212 B1 | 1/2015 | Fu et al. |
| 9,079,662 B1 | 7/2015 | Duffy et al. |
| 9,908,632 B1 * | 3/2018 | Kimchi .................. B64D 31/06 |
| 9,919,797 B2 * | 3/2018 | Chan ..................... B64C 39/024 |
| 10,011,353 B1 * | 7/2018 | Beckman ............. G05D 1/0858 |
| 2007/0102565 A1 | 5/2007 | Speer et al. |

(Continued)

FOREIGN PATENT DOCUMENTS

| | | |
|---|---|---|
| CN | 103963972 A | 8/2014 |
| EP | 2818406 A1 | 12/2014 |

(Continued)

OTHER PUBLICATIONS

Smith, Scot et al. "Design Considerations for Remote Sensing Payloads on Inexpensive Unmanned Autonomous Aerial Vehicles." Surveying and land information science 70.3 (2010): 131-137. Print. (Year: 2010).*

(Continued)

*Primary Examiner* — Akiba K Robinson
(74) *Attorney, Agent, or Firm* — Athorus, PLLC

(57) ABSTRACT

This disclosure describes a collective UAV in which multiple UAVs may be coupled together to form the collective UAV. A collective UAV may be used to aerially transport virtually any size, weight or quantity of items, travel longer distances, etc. For example, rather than using one large UAV to carry a larger or heavier item, multiple smaller UAVs may couple together to form a collective UAV that is used to carry the larger or heavier item.

21 Claims, 15 Drawing Sheets

(56) References Cited

U.S. PATENT DOCUMENTS

| | | |
|---|---|---|
| 2008/0078865 A1 | 4/2008 | Burne |
| 2010/0025523 A1* | 2/2010 | Kutzmann ............ B64C 39/024 |
| | | 244/2 |
| 2010/0193625 A1 | 8/2010 | Sommer |
| 2011/0049288 A1 | 3/2011 | Suzuki |
| 2012/0061506 A1 | 3/2012 | Gomez et al. |
| 2012/0158215 A1 | 6/2012 | Sun et al. |
| 2013/0233964 A1 | 9/2013 | Woodworth et al. |
| 2014/0032034 A1 | 1/2014 | Raptopoulos et al. |
| 2014/0374532 A1 | 12/2014 | Duffy et al. |
| 2015/0120126 A1 | 4/2015 | So et al. |
| 2015/0147976 A1* | 5/2015 | Wang .................... G05D 1/0022 |
| | | 455/65 |
| 2015/0336677 A1 | 11/2015 | Smaoui et al. |
| 2016/0304199 A1* | 10/2016 | Chan ..................... B64C 39/024 |
| 2016/0304217 A1* | 10/2016 | Fisher ................. B60L 11/1809 |
| 2016/0351089 A1 | 12/2016 | Salem |

FOREIGN PATENT DOCUMENTS

| | | |
|---|---|---|
| EP | 2881324 A1 | 6/2015 |
| JP | 2002211496 A | 7/2002 |
| JP | 2008150028 A | 7/2008 |
| JP | 2010047109 A | 3/2010 |
| JP | 2013525185 A | 6/2013 |
| JP | 2013531573 A | 8/2013 |
| JP | 2014126299 A | 7/2014 |
| KR | 101614620 B1 | 4/2016 |
| WO | 2010021295 A1 | 2/2010 |
| WO | 2011133944 A1 | 10/2011 |
| WO | 2011149544 A1 | 12/2011 |
| WO | 2014080386 | 5/2014 |
| WO | 2014096144 A1 | 6/2014 |
| WO | 2017173502 A1 | 10/2017 |

OTHER PUBLICATIONS

International Search Report and Written Opinion of PCT/US16/18552 dated May 4, 2016.

Search Report dated Nov. 4, 2019, for corresponding CN Application No. 201680012113.0.

* cited by examiner

COLLECTIVE UNMANNED AERIAL VEHICLE CONFIGURATIONS

BACKGROUND

Unmanned aerial vehicles ("UAVs") are often designed to carry a payload and/or to remain airborne for a specified duration of time. For example, many multi-propeller aerial vehicles (e.g., quad-copters, octo-copters) are designed to carry a payload of up to ten pounds and remain airborne for up to thirty minutes. To carry larger payloads, the UAV typically has to be larger, with larger motors, larger propellers, and larger power modules to generate lifting forces sufficient to carry the larger payloads. Likewise, for extended flight duration, additional or larger power modules are typically necessary.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
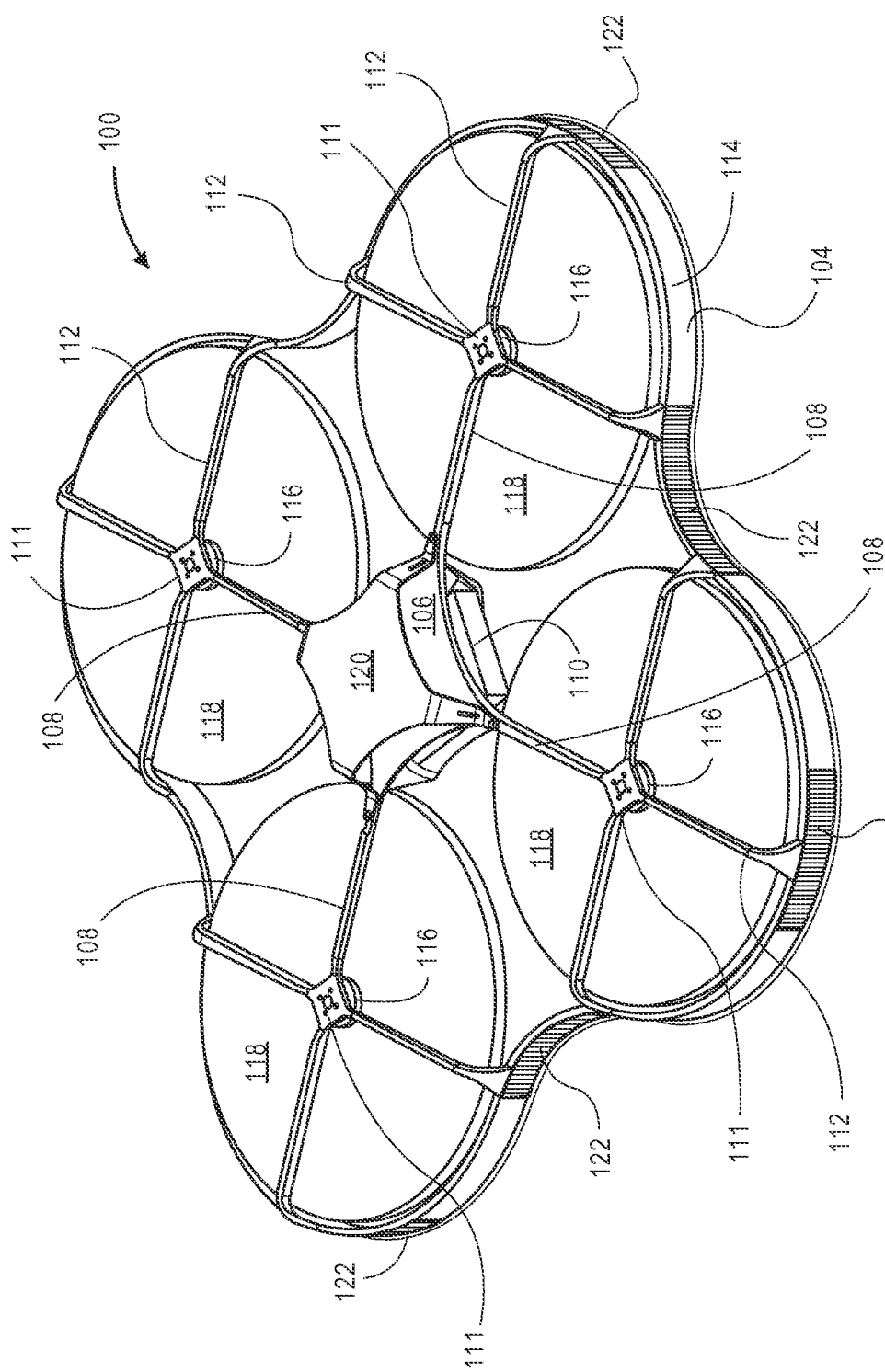
FIG. 1 depicts a view of a UAV configuration, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components or UAVs connected together, whether that connection is permanent (e.g., welded) or temporary (e.g., bolted, mechanical), direct or indirect (i.e., through an intermediary), mechanical, chemical, optical, or electrical. Furthermore, as used herein, "horizontal" flight refers to flight traveling in a direction substantially parallel to the ground (i.e., sea level), and that "vertical" flight refers to flight traveling substantially radially outward from the earth's center. It should be understood by those having ordinary skill that trajectories may include components of both "horizontal" and "vertical" flight vectors.

DETAILED DESCRIPTION

This disclosure describes a collective UAV configuration in which multiple UAVs may be coupled together to form a collective UAV. A collective UAV, as used herein, is two or more coupled UAVs. A collective UAV may be used to aerially transport virtually any size, weight, or quantity of items, travel longer distances, etc. For example, rather than using one large UAV to carry a larger or heavier item, multiple smaller UAVs may couple together to form a collective UAV that is used to carry the larger or heavier item.

In many instances, a single UAV configuration may be capable of delivering a large percentage of the ordered items. However, some items may require a larger UAV that is capable of lifting and aerially transporting a larger or heavier item. Likewise, some orders for items may specify delivery destinations that require a UAV with longer flight duration. Rather than having to maintain multiple UAV configurations or utilize a UAV configuration that is not necessary for the majority of the item deliveries, the implementations described herein utilize multiple UAVs to form a collective UAV that is capable of transporting larger and/or heavier items or aerially navigating longer distances.

In addition to forming a collective UAV to carry larger and/or heavier items or to aerially navigate longer distances, as described herein, UAVs that are capable of carrying an item independent of other UAVs may couple to form a collective UAV to aerially navigate as a collective UAV to a delivery area. When one or all of the UAVs reach the delivery area, the UAVs may decouple to deliver items to different delivery destinations. By aerially navigating as a collective UAV, the coupled UAVs can share resources (e.g., computing resources, power, navigation, etc.), be more efficient, be more visible, generate larger radar or object detection, be more detectable by ground based radar or air traffic control, etc. For example, a collective UAV that includes multiple coupled UAVs (e.g., twenty) will be more visible to other aircraft as well as air traffic control, thereby improving safety for the UAVs and other aircraft. Likewise, when multiple UAVs are coupled to form a collective UAV, some of the UAVs may reduce the rotational speed of one or more of their motors, relying on the lifting force of the collective UAV, thereby reducing the overall energy consumed during aerial navigation.

FIG. 1 illustrates a view of a UAV 100, according to an implementation. As illustrated, the UAV 100 includes a frame 104. The frame 104 or body of the UAV 100 may be formed of any suitable material, such as graphite, carbon fiber, aluminum, titanium, etc., or any combination thereof. In this example, the frame 104 of the UAV 100 is a single carbon fiber frame. The frame 104 includes a hub 106, motor arms 108, motor mounts 111, support arms 112, and a perimeter protective barrier 114. In this example, there is a single hub 106, four motor arms 108, four motor mounts 111, twelve support arms 112, and a single perimeter protective barrier 114. In other implementations, a UAV may include additional or fewer hubs, motor arms, motor mounts, support arms, or protective barriers.

Each of the motor arms 108 extend from the hub 106 and couple with or terminate into the motor mounts 111. Lifting motors 116 are coupled to an inner side of the motor mount 111 so that the lifting motor 116 and corresponding lifting propeller 118 are within the frame 104. In one implementation, the lifting motors 116 are mounted so that the propeller shaft of the lifting motor that mounts to the lifting propeller 118 is facing downward with respect to the frame 104. In other implementations, the lifting motors may be mounted at other angles with respect to the frame 104 of the UAV 100. The lifting motors may be any form of motor capable of generating enough rotational speed with the propellers to lift the UAV 100 and an engaged payload, thereby enabling aerial transport of the payload.

Mounted to each lifting motor 116 is a lifting propeller 118. The lifting propellers 118 may be any form of propeller (e.g., graphite, carbon fiber) and of a size sufficient to lift the UAV 100 and any payload engaged by the UAV 100 so that the UAV 100 can navigate through the air, for example, to deliver a payload to a delivery destination. For example, the lifting propellers 118 may each be carbon fiber propellers having a dimension or diameter of twenty-nine inches. While the illustration of FIG. 1 shows the lifting propellers 118 all of a same size, in some implementations, one or more of the lifting propellers 118 may be different sizes and/or dimensions. Likewise, while this example includes four lifting propellers, in other implementations, more or fewer propellers may be utilized as lifting propellers 118. Likewise, in some implementations, the lifting propellers 118 may be positioned at different locations on the UAV 100. In addition, alternative methods of propulsion may be utilized as "motors" in implementations described herein. For example, fans, jets, turbojets, turbo fans, jet engines, internal combustion engines, and the like may be used (either with propellers or other devices) to provide lift for the UAV.

Extending from each motor mount 111 are three support arms 112 that couple with or otherwise terminate into the perimeter protective barrier 114. The perimeter protective barrier 114 extends around the perimeter of the UAV and encompasses the lifting propellers 118. In some implementations, the perimeter protective barrier 114 may include a vertical component that extends substantially downward from the support arms and approximately perpendicular to the axis of rotation of the lifting propellers 118. The vertical component may be of any vertical dimension and width. For example, the vertical component may have a vertical dimension of approximately three inches and a width of approximately 0.5 inches. In other implementations, the vertical dimension and/or the width may be larger or smaller. Likewise, the vertical component of the perimeter protective barrier may include a core, such as a foam, wood and/or plastic core. The vertical component may be coupled to each of the support arms and extend around the outer perimeter of each propeller 118 to inhibit access to the propellers from the sides of the UAV 100.

The perimeter protective barrier 114 provides safety for objects foreign to the UAV 100 by inhibiting access to the propellers 118 from the side of the UAV 100, provides protection to the UAV 100 and increases the structural integrity of the UAV 100. For example, if the UAV 100 is traveling horizontally and collides with a foreign object (e.g., wall, building), the impact between the UAV and the foreign object will be with the perimeter protective barrier 114, rather than a propeller. Likewise, because the frame is interconnected, the forces from the impact are dissipated across the frame 104.

Likewise, the perimeter protective barrier 114 provides a surface upon which one or more components of the UAV may be mounted. For example, one or more antennas may be mounted to the perimeter protective barrier 114. The antennas may be used to transmit and/or receive wireless communications. For example, the antennas may be utilized for Wi-Fi, satellite, near field communication ("NFC"), cellular communication, or any other form of wireless communication. Other components, such as cameras, time of flight sensors, distance determining elements, gimbals, Global Positioning System ("GPS") receiver/transmitter, radars, illumination elements, speakers, and/or any other component of the UAV 100 or the UAV control system (discussed below), etc., may likewise be mounted to the perimeter protective barrier 114. Likewise, identification or reflective identifiers may be mounted to the vertical component to aid in the identification of the UAV 100.

The perimeter protective barrier 114 may also include one or more coupling components 122. The coupling components may be configured to enable coupling between the UAV 100 and another UAV to form a collective UAV. In this example, there are multiple coupling components 122 distributed at different locations along the perimeter protective barrier 114, thereby enabling coupling of the UAV 100 at different locations and/or coupling of the UAV 100 with multiple other UAVs. In some implementations, the entire protective barrier 114 may include coupling components, thereby enabling coupling of UAVs at any position and/or orientation with the UAV 100. The coupling component may provide any form of coupling sufficient to engage two or more UAVs together. For example, the coupling component may include a mechanical coupling, an electrical coupling, an electromechanical coupling, a magnetic coupling, an electromagnetic coupling, etc. In one implementation, the protective barrier 114 may include a series of electromagnets that may be activated by the UAV control system 110 to couple the UAV 100 with another UAV or deactivated to decouple the UAV 100 from another UAV. In other implementations, the coupling may be a static or stationary coupling such as a series of latches or grooves that mate together to couple two or more UAVs.

Figure 5:
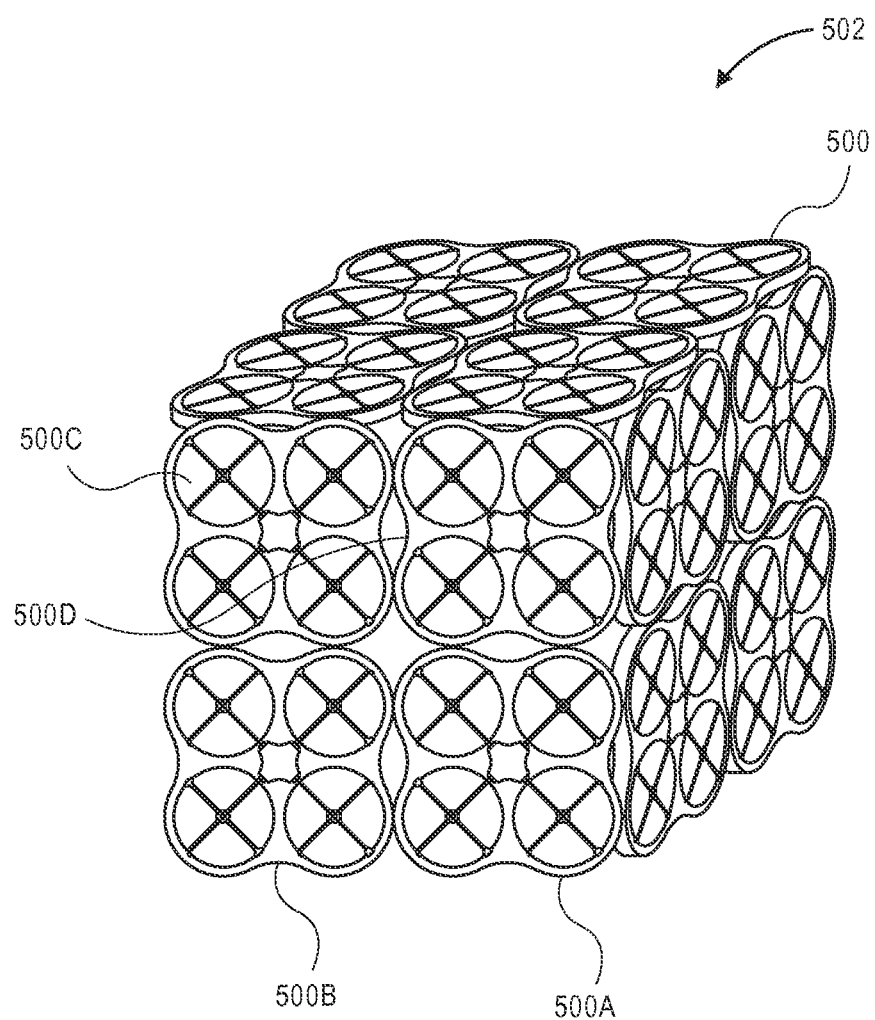
FIG. 5 depicts a view of another collective UAV configuration, according to an implementation.

The coupling components 122 may be on the side, top, or bottom of the perimeter protective barrier 114 to enable coupling of other UAVs at different angles or orientations. For example, the UAV 100 may include a coupling component on a top of the mounting plate 120 so that the UAV 100 may be coupled with a second UAV in a vertical configuration. An example collective UAV configuration with UAVs coupled in different orientations is illustrated in FIG. 5.

In some implementations, the coupling components 122 could be hinged or otherwise configured to allow pivoting or rotation between coupled UAVs. For example, as discussed below with respect to FIG. 4, the coupling components may allow one or more degrees of freedom in rotation between coupled UAVs to allow the collective UAV configuration to flex or adjust as it navigates.

In addition to providing a physical coupling between two or more UAVs, the coupling component 122 may provide electrical and/or data communication between coupled UAVs. For example, UAVs may exchange navigation information and/or share computing resources via a data transmission between the coupling components 122 of the coupled UAVs. Likewise, power resources may be shared via the coupling components 122 of the UAVs. For example, the UAV 100 may have excess power supply stored in the power modules. While the UAV 100 is coupled with another UAV, it may provide the excess power supply to the coupled UAV via the connection component 122.

While the example illustrated in FIG. 1 shows a perimeter protective barrier 114 with a vertical component and a series of coupling components 122, in other implementations, the perimeter protective barrier may have other configurations. For example, the perimeter protective barrier may be angled (e.g., forty-five degree angle) with respect to the UAV 100, and extend from above the lifting propellers where it is coupled with the support arms 112 to below the lifting propellers 118. The angles on different sides of the UAV 100 may extend in opposite directions. Other UAVs may couple with the UAV 100 by aligning an opposing angled side with a side of the UAV 100 and coupling the coupling components between the two UAVs. Such a configuration may improve the aerodynamics of the UAV 100 and/or a collective UAV configuration. In other implementations, the perimeter protective barrier may have other configurations or designs.

In addition to providing protection for the UAV 100 and coupling components to enable coupling of multiple UAVs, the frame 104 provides structural support for the UAV 100. By interconnecting the hub 106, motor arms 108, motor mounts 111, support arms 112, and perimeter protective barrier 114, the resulting frame has structural stability and is sufficient to support the lifting motors, lifting propellers, a payload (e.g., items), UAV control system, and/or other components of the UAV.

In some implementations, the frame 104 may also include a permeable material (e.g., mesh, screen) that extends over the top and/or lower surface of the frame to inhibit vertical access to the propellers from above or below the propellers 118. Likewise, in some implementations, one or more mounting plates 120 may be affixed to the frame 104 to provide additional surface area for mounting components to the UAV 100. The mounting plates 120 may be removably coupled to the frame 104, for example, using screws, fasteners, etc. Alternatively, the mounting plates 120 may be formed as part of the frame 104.

A UAV control system 110 is also mounted to the frame 104. In this example, the UAV control system 110 is mounted between the hub 106 and a mounting plate 120. The UAV control system 110, as discussed in further detail below with respect to FIG. 14, controls the operation, routing, navigation, communication, motor controls, resource sharing, coupling components 122, and the payload engagement mechanism of the UAV 100.

Likewise, the UAV 100 includes one or more power modules (not shown). The power modules may be mounted to various locations on the frame. For example, in some implementations, four power modules may be mounted to each mounting plate 120 and/or to the hub 106 of the frame. The power modules for the UAV 100 may be in the form of battery power, solar power, gas power, super capacitor, fuel cell, alternative power generation source, or a combination thereof. For example, the power modules may each be a 6000 mAh lithium-ion polymer battery, or polymer lithium ion (Li-poly, Li-Pol, LiPo, LIP, PLI or Lip) battery. The power module(s) are coupled to and provide power for the UAV control system 110, the lifting motors 116, the payload engagement mechanism, the coupling components 122, etc.

In some implementations, one or more of the power modules may be configured such that it can be autonomously removed and/or replaced with another power module while the UAV is landed or in flight. For example, when the UAV lands at a location, the UAV may engage with a charging member at the location that will recharge the power module. As another example, when the UAV is coupled to and part of a collective UAV, it may receive excess power from another coupled UAV and utilize that excess power to provide power to the UAV 100 components and/or to re-charge the power module(s) of the UAV 100.

As mentioned above, the UAV 100 may also include a payload engagement mechanism (not shown). The payload engagement mechanism may be configured to engage and disengage items and/or containers that hold items. In this example, the payload engagement mechanism is positioned beneath and coupled to the hub 106 of the frame 104 of the UAV 100. The payload engagement mechanism may be of any size sufficient to securely engage and disengage containers that contain items. In other implementations, the payload engagement mechanism may operate as the container, in which it contains item(s). The payload engagement mechanism communicates with (via wired or wireless communication) and is controlled by the UAV control system 110. In some implementations, the payload engagement mechanism may be configured to operate in conjunction with payload engagement mechanisms of other UAVs that are coupled to form a collective UAV to engage/disengage larger items.

While the implementations of the UAV 100 discussed herein utilize propellers to achieve and maintain flight, in other implementations, the UAV may be configured in other manners. For example, the UAV may include fixed wings and/or a combination of both propellers and fixed wings.

Figure 2:
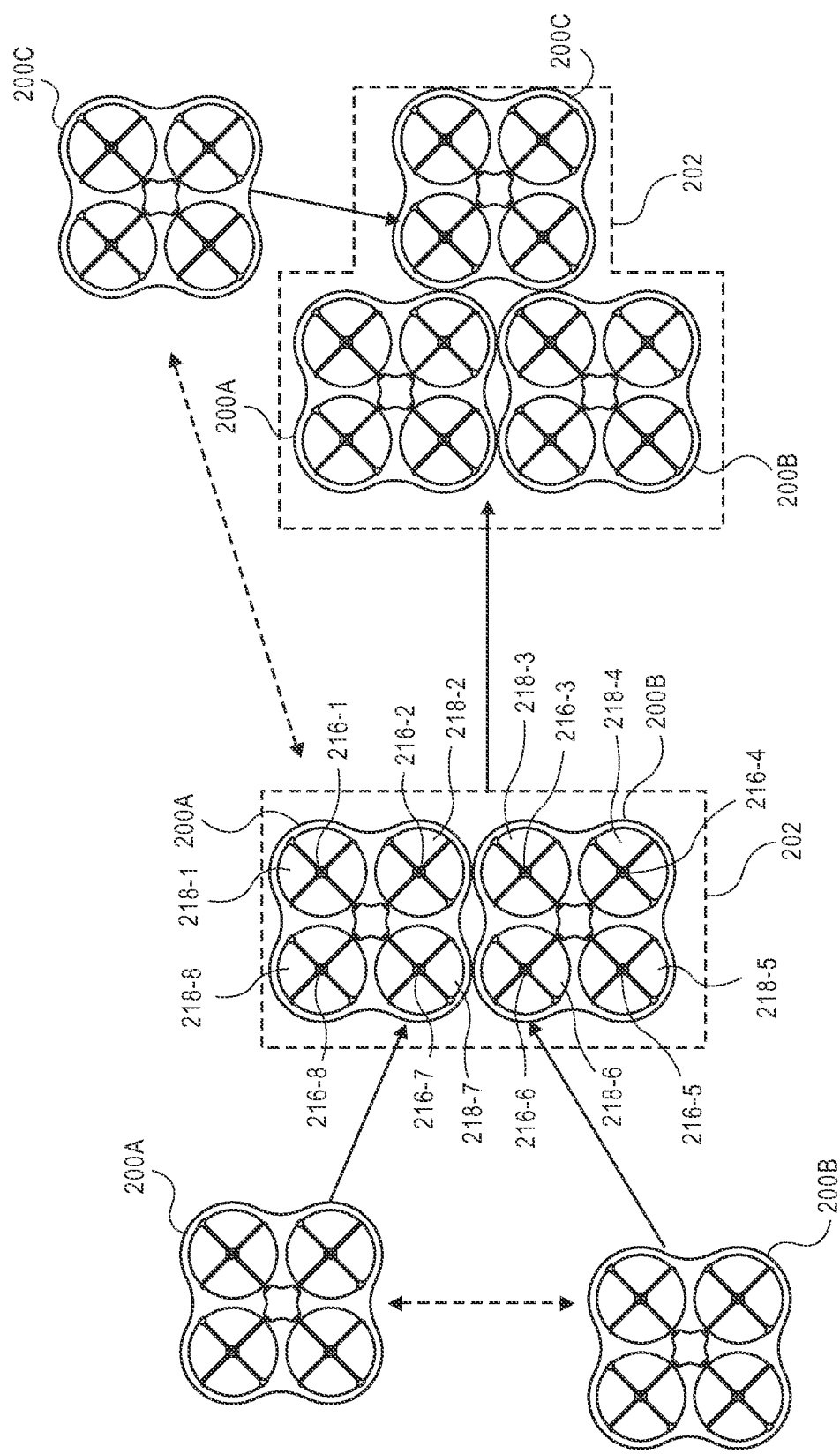
FIG. 2 depicts a top-down view of a plurality of UAVs forming a collective UAV, according to an implementation.

FIG. 2 depicts a top-down view of a plurality of UAVs 200 forming a collective UAV 202, according to an implementation. As illustrated in this example, two UAVs 200A, 200B wirelessly communicate to determine if they should couple to form a collective UAV 202. For example, each UAV 200 may exchange flight plan information, configuration information, etc., to determine if forming a collective UAV is beneficial. In one implementation, if the flight plans of each UAV are complementary, it may be determined that the UAVs should couple to form a collective UAV 200. Flight plans may be determined to be complementary if the UAVs 200 are navigating in a similar direction, toward a similar destination (e.g., materials handling facility, delivery area, etc.), coupling would result in a net power savings, coupling would result in increased safety, coupling would result in faster aerial transport, etc. For example, if UAV 200A and UAV 200B are both navigating to the same materials handling facility, it may be determined that their flight plans are complementary. As another example, if UAV 200A is navigating to a first delivery area and UAV 200B is navigating to a second delivery area, it may be determined that the flight plans of the two UAVs 200A, 200B are complementary if UAV 200B will pass the first delivery area within a defined distance as it navigates to the second delivery area.

Other factors may also be considered in determining if UAVs should couple. For example, the remaining power of each UAV may be considered, weather and/or other external factors may also be considered. For example, if the UAVs are in an area with other aircraft, it may be determined that the UAVs should couple to form a collective UAV to increase visibility of the UAVs to other aircraft.

If it is determined that the two UAVs 200A, 200B are to couple, the UAVs will determine a collective UAV configuration and then couple according to that collective UAV configuration to form a collective UAV 200. The collective UAV configuration may be determined by one or more of the UAVs 200A, 200B, and/or may be determined by a collective UAV configuration system 1528 (FIG. 15) operating on a remote computing resource and provided wirelessly to one or more of the UAVs 200A, 200B.

Once coupled, the UAVs 200A, 200B may determine or receive from the collective UAV configuration system 1528 combined operating information and a collective flight plan. For example, if the two UAVs 200A, 200B are navigating to the same materials handling facility, one or more of the UAVs may determine a collective UAV flight plan that is to be followed by each UAV to navigate the collective UAV to the materials handling facility.

The UAVs may operate in a distributed manner, each UAV navigating a component or offset of the flight plan and controlling the motors of the UAV. In other implementations, one or more of the UAVs may control the collective UAV configuration. For example, UAV 200A may be designated as the master UAV of the collective UAV 202 and provide speed control instructions to the motors of the UAV 200A and the motors of the UAV 200B, to control the operation and navigation of the collective UAV 202. In such an implementation, data may be exchanged between the UAVs through the coupling components that couple the UAVs and/or transmitted wirelessly. Likewise, one or more components of the slave UAV 200B, such as the control system, may transition to a lower power state, thereby conserving power.

In some implementations, one or more of the UAVs 200A, 200B may also determine if the rotational speed of one or more of the motors of the UAV may be reduced or terminated. For example, because UAV 200A has coupled with UAV 200B, the collective UAV 202 has eight motors and propellers. In some implementations, the rotational speed of the interior motors 216-2, 216-3, 216-6, 216-7 and corresponding interior propellers 218-2, 218-3, 218-6, 218-7 of the collective UAV 202 may be reduced or terminated and the exterior motors 216-1, 216-4, 216-5, 216-8 and corresponding exterior propellers 218-1, 218-4, 218-5, 218-8 may be utilized to aerially navigate the collective UAV 202.

Any number or combination of UAVs may couple to form any size and configuration of a collective UAV 202. As illustrated in FIG. 2, a third UAV 200C wirelessly communicates with the collective UAV 202 and then couples with and becomes part of the collective UAV 202. As with the initial coupling of UAVs 200A, 200B, the UAVs 200 may directly communicate, exchanging UAV configurations, collective UAV configuration, flight plan information, etc. Alternatively, the collective UAV configuration system 1528 may wirelessly send instructions to the collective UAV 202 and/or the UAV 200C instructing the coupling of the UAV 200C to the collective UAV 202.

A UAV 200C may couple with one or more UAVs that form a collective UAV 202. As illustrated in FIG. 2, the UAV 200C has coupled with both UAV 200A and UAV 200B according to a determined collective UAV configuration. The collective UAV configuration may take any form and may vary depending on, for example, the number of UAVs forming the collective UAV, the weather, the number and/or weight of items carried by UAVs of the collective UAV, power requirements, whether one or more of the UAVs of the collective UAV is damaged or inoperable, etc.

Figure 3:
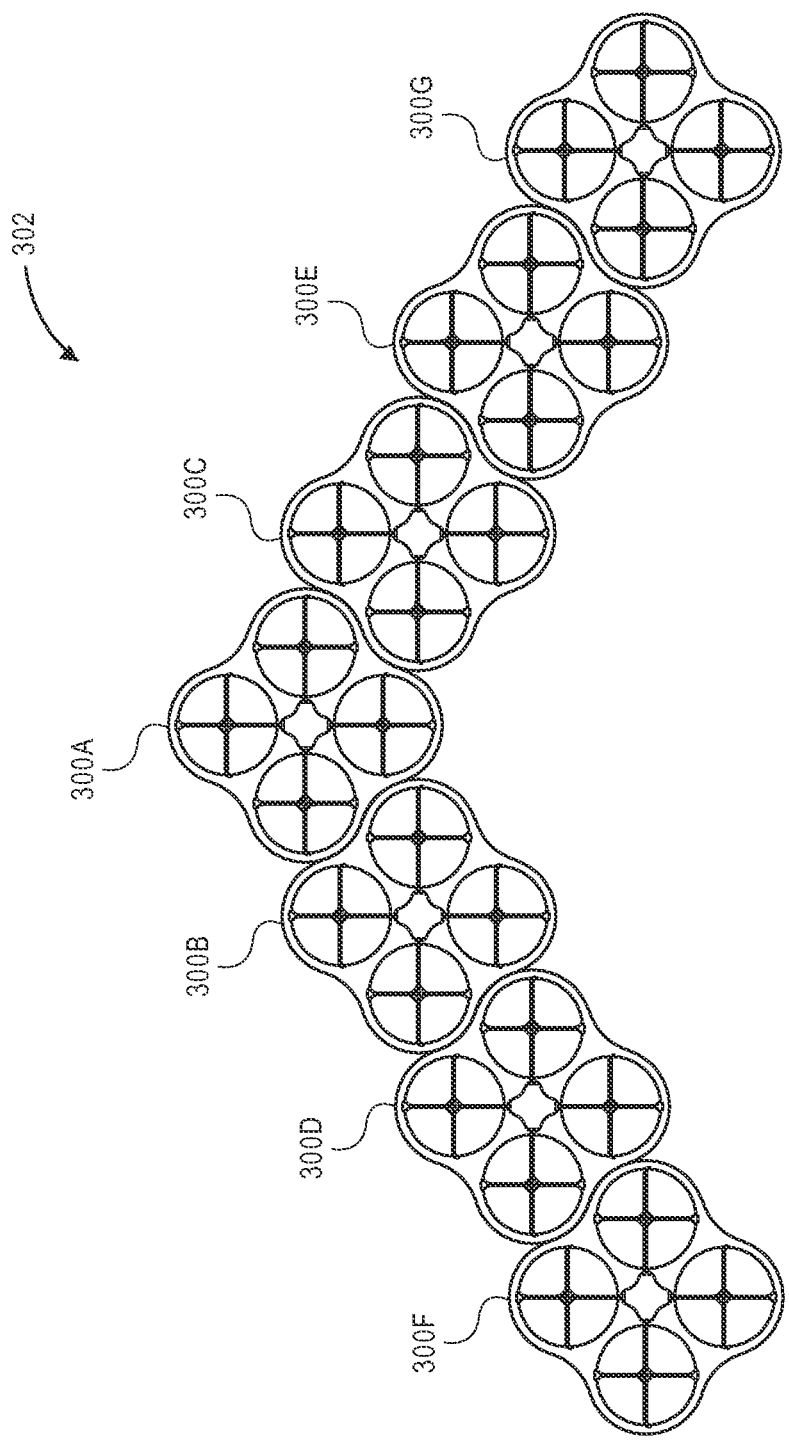
FIG. 3 depicts a top-down view of a collective UAV configuration, according to an implementation.

For example, FIG. 3 depicts a top-down view of a collective UAV 302 having a "V" configuration, according to an implementation. The collective UAV 302, in this example, includes seven UAVs 300A, 300B, 300C, 300D, 300E, 300F, 300G that are coupled to form the collective UAV 302. Each UAV 300 is coupled to one other UAV of the collective UAV. The V configuration of the collective UAV may be utilized to provide better aerodynamics, benefit from lift from leading UAVs of the collective UAV, and/or reduce the overall power consumed by the collective UAV.

Figure 4:
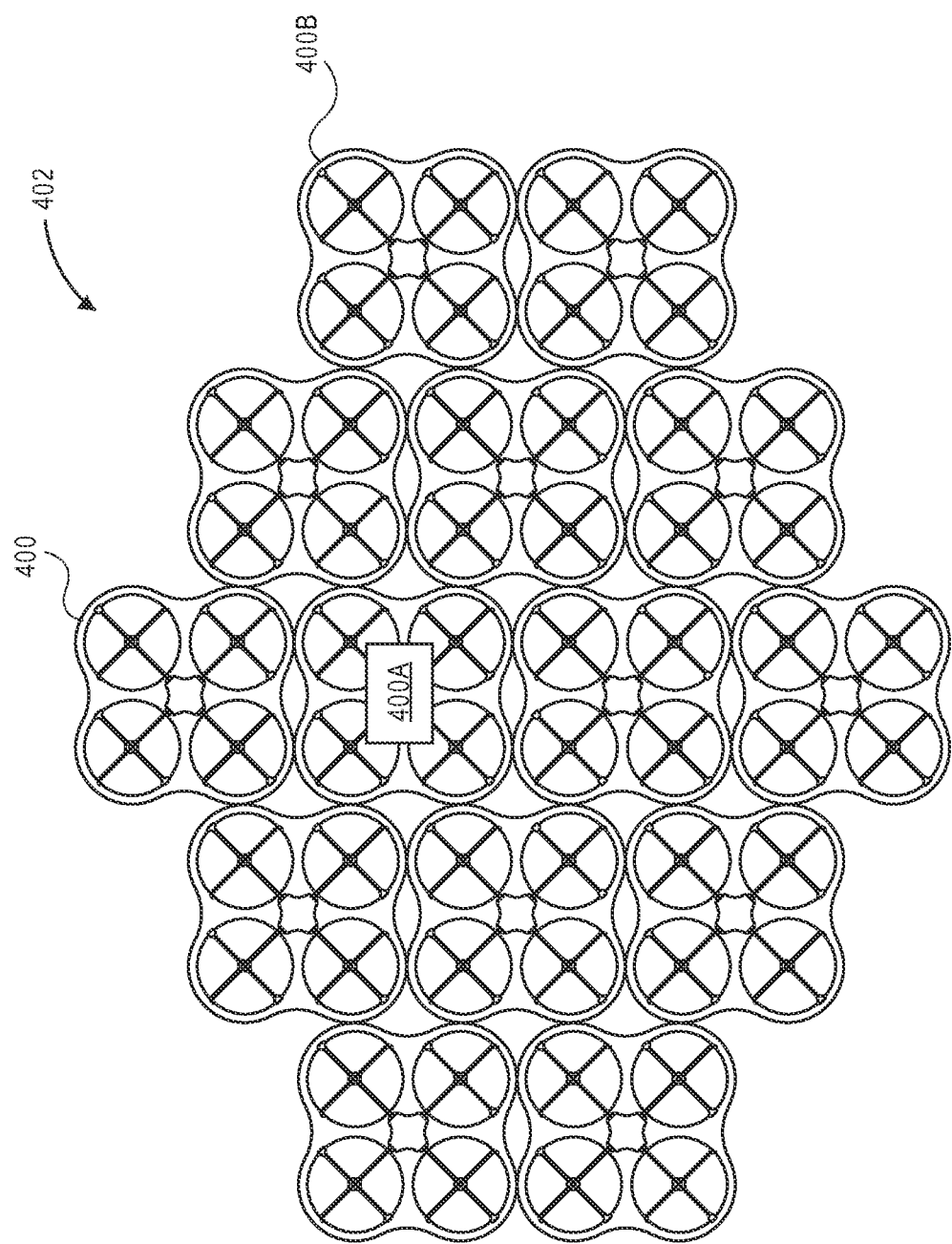
FIG. 4 depicts a top-down view of another collective UAV configuration, according to an implementation.

FIG. 4 depicts another top-down view of a collective UAV 402 having a different configuration, according to an implementation. In this example, there are fourteen UAVs 400 coupled to one another to form the collective UAV 402. In this example, each UAV is coupled to at least one other UAV to form the collective UAV 402. Some of the UAVs are coupled to up to six different UAVs. In some implementations, the coupling components that couple one or more of the UAVs 400 of the collective UAV 402 may allow one or more degrees of freedom of rotation at the coupling. For example, as the collective UAV 400 adjusts its heading, yaw, pitch and/or roll, the leading perimeter UAVs 400 may begin the adjustment and the coupling between those leading perimeter UAVs 400 may allow flex between the leading perimeter UAVs and the UAVs 400 to which they are coupled. As the collective UAV 402 adjusts its heading, yaw, pitch, and/or roll, the other coupled UAVs 400 will likewise adjust until the adjustment of the collective UAV 402 has completed.

FIG. 5 is another illustration of a collective UAV 502, according to an implementation. In comparison to the collective UAVs discussed above with respect to FIGS. 2-4, the collective UAV 502 illustrates UAVs coupled at different orientations. In this example, the collective UAV 502 is in the form of a cube that includes a total of twenty-four UAVs 500 coupled to form the cube; each side of the cube including four UAVs 500. While FIG. 5 illustrates the collective UAV 502 in the form of a cube, the collective UAV may be arranged to have any shape. For example, rather than a cube, the UAVs may couple to form a sphere shaped collective UAV 502.

In a cube shape, such as that illustrated in FIG. 5, the collective UAV 502 includes larger surface area on each side of the collective UAV 502 making it more detectable by other aircraft and/or flight control systems. Likewise, the propellers of the UAVs on different sides of the collective UAV 502 may be utilized to adjust the heading, pitch, yaw, and/or roll of the UAV. Still further, one or more of the propellers on a side of the collective UAV 502 may be utilized to provide horizontal thrust to propel the collective UAV in a direction that includes a horizontal component. For example, the propellers of the UAVs 500A, 500B, 500C, and 500D that are coupled to form a side of the collective UAV 502 may be utilized to provide horizontal thrust for the collective UAV 502. Likewise, the propellers on the top and/or bottom of the collective UAV 502 may provide lifting force to lift the collective UAV 502.

As discussed above with respect to FIG. 2, the UAVs of a collective UAV, such as those illustrated in FIGS. 2-5, may share resources, reduce rotational speed of one or more motors, and/or otherwise function as a collective to reduce the overall power consumed by the collective UAV and/or to extend the distance or time the collective UAV may aerially navigate. For example, referring again to FIG. 4, the interior UAVs, such as UAV 400A, is coupled to six other UAVs and may be able to reduce and/or terminate the rotation of the motors of the UAV 400A and be supported by the other UAVs 400 of the collective UAV 402, thereby conserving power. In comparison, UAV 400B, which is on the perimeter of the collective UAV 402, may maintain rotational speed of some or all of its motors to provide sufficient lift to aerially navigate the collective UAV 402. In this example, UAV 400B may operate in conjunction with each of the other UAVs 400 coupled along the perimeter of the collective UAV 402.

As additional UAVs couple with a collective UAV and/or as UAVs decouple from a collective UAV, the UAV configuration changes and one or more of the other UAVs of the collective may decrease or increase the rotational speed of one or more of its motors and/or share resources with the collective UAV. Likewise, as discussed above, a collective UAV may operate in a distributed manner, with each UAV maintaining and operating the motors and/or other components of the UAV. Alternatively, the collective UAV may operate in a master-slave configuration in which one of the UAVs of the collective UAV operates as a master, providing navigation instructions, motor speed control instructions, etc., to the other UAVs of the collective UAV. Any control scheme may be utilized to maintain the operation and control of the collective UAV and the distributed configuration and master-slave configuration are provided only as examples. For example, the collective UAV configuration system 1528 may provide navigation instructions to each of the UAVs of the collective UAV.

Figure 6:
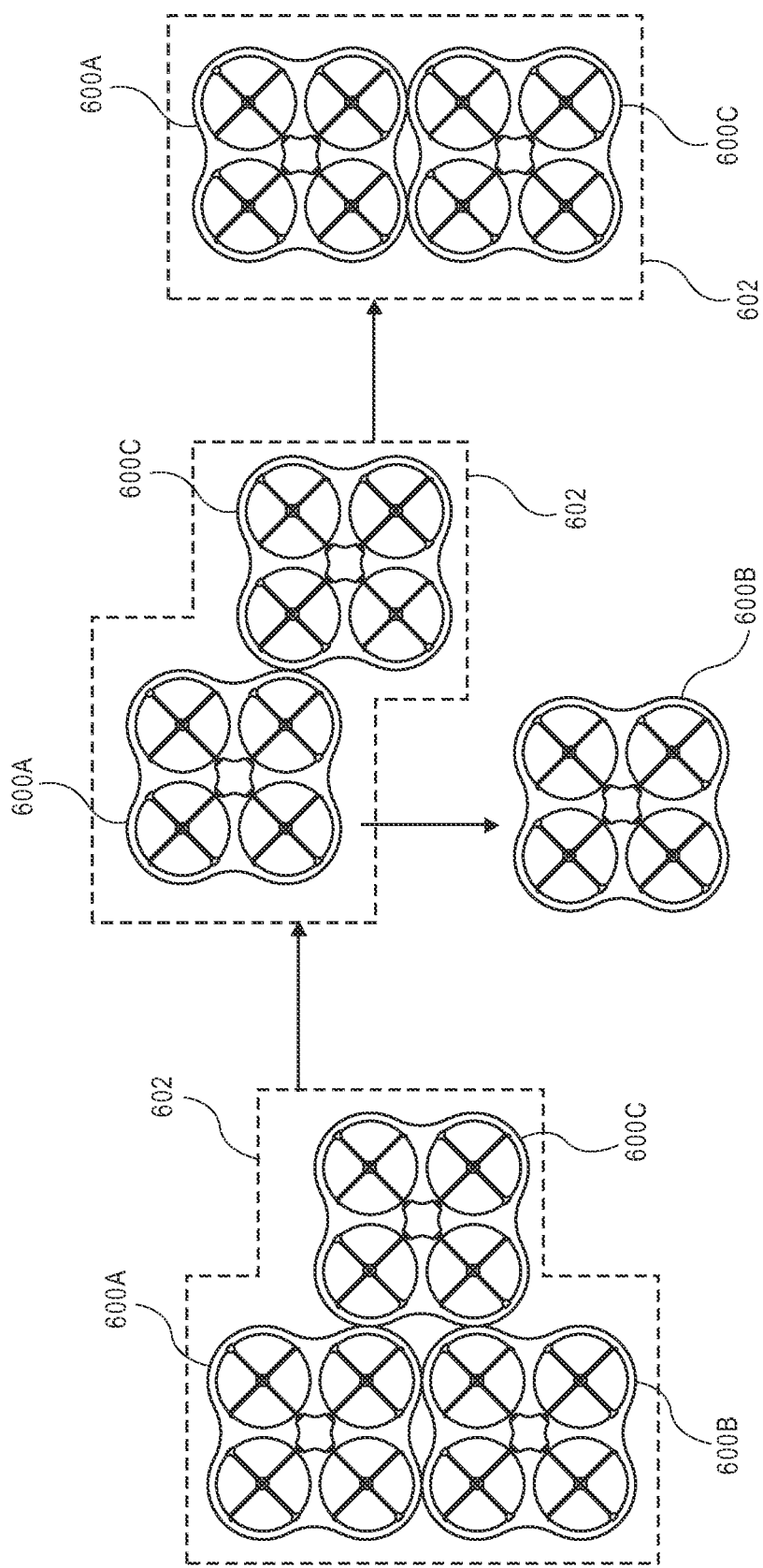
FIG. 6 depicts a top-down view of a collective UAV configuration with a UAV decoupling from the collective UAV, according to an implementation.

FIG. 6 depicts a top-down view of a collective UAV 602 with a UAV 600B decoupling from the collective UAV, according to an implementation. In this example, the collective UAV 602 includes three coupled UAVs 600A, 600B, 600C that are aerially navigating along a flight path. At some point during aerial navigation, UAV 600B decouples from the collective UAV 602. For example, UAV 600B may have reached a point in the flight path where it is to decouple from the collective UAV and navigate to another location (e.g., delivery destination).

Upon decoupling from the collective UAV 602, the UAV 600B may resume aerial navigation utilizing its own UAV control system to aerially navigate to a destination. Likewise, when a UAV decouples from a collective UAV 602, the collective UAV 602 determines the updated collective UAV configuration and/or whether the remaining UAVs 600A, 600C of the collective UAV 602 should reconfigure into a different configuration. For example, upon decoupling of UAV 600B, the remaining UAVs 600A, 600C are coupled with one coupling component and offset from one-another. Because this may not be a preferred UAV configuration, it may be determined that the UAVs 600A, 600C should decouple and then recouple to form a different UAV configuration, as illustrated. In other implementations, the UAVs may remain in the existing configuration.

While the example illustrated in FIG. 6 shows a perimeter UAV 600B of the collective UAV 602 decoupling, in other implementations, any UAV of a collective UAV may decouple. For example, referring back to FIG. 4, the UAV 400A may decouple from the collective UAV 402. In such an example, the collective UAV 402 may reconfigure, another UAV that is either already coupled with the collective UAV or requesting to couple with the UAV may be instructed to assume the position of the now decoupled UAV 400A, or an empty space may be left in the collective UAV 402.

Figure 7:
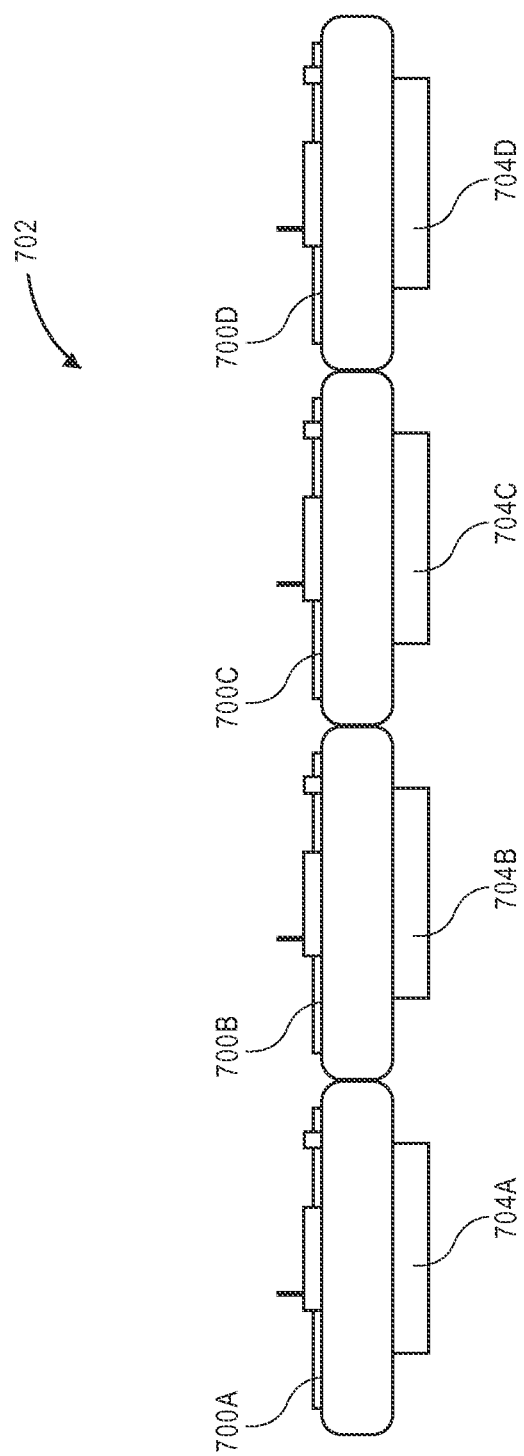
FIG. 7 depicts a side-view of a collective UAV configuration, according to an implementation.

As discussed above, one or more UAVs of a collective UAV may carry a payload (e.g., item or item package) or multiple UAVs of the collective UAV may operate together to carry a single payload. For example, FIG. 7 depicts a side-view of a collective UAV configuration 702, according to an implementation. In this example, each UAV 700A, 700B, 700C, 700D is carrying a respective payload 704A, 704B, 704C, 704D. As discussed further below, the UAVs 700 of the collective UAV 702 may all be navigating to a delivery area in which they will deliver the respective payload 704 to a delivery destination within that delivery area. The UAVs 700 may couple to form the collective UAV 702 as they aerially navigate from a location (e.g., materials handling facility) until they reach the delivery area. As the collective UAV reaches the delivery area, one or more of the UAVs 700 may decouple and complete delivery of the payload to the delivery destination.

Likewise, as UAVs complete delivery of a payload, they may couple with other UAVs to form a collective UAV to aerially navigate from the delivery area. For example, as the UAVs 700 complete delivery of the payloads 704 to respective delivery destinations, the UAVs may couple back together to form the collective UAV 702 and aerially navigate to another location (e.g., return to the materials handling facility).

Figure 8:
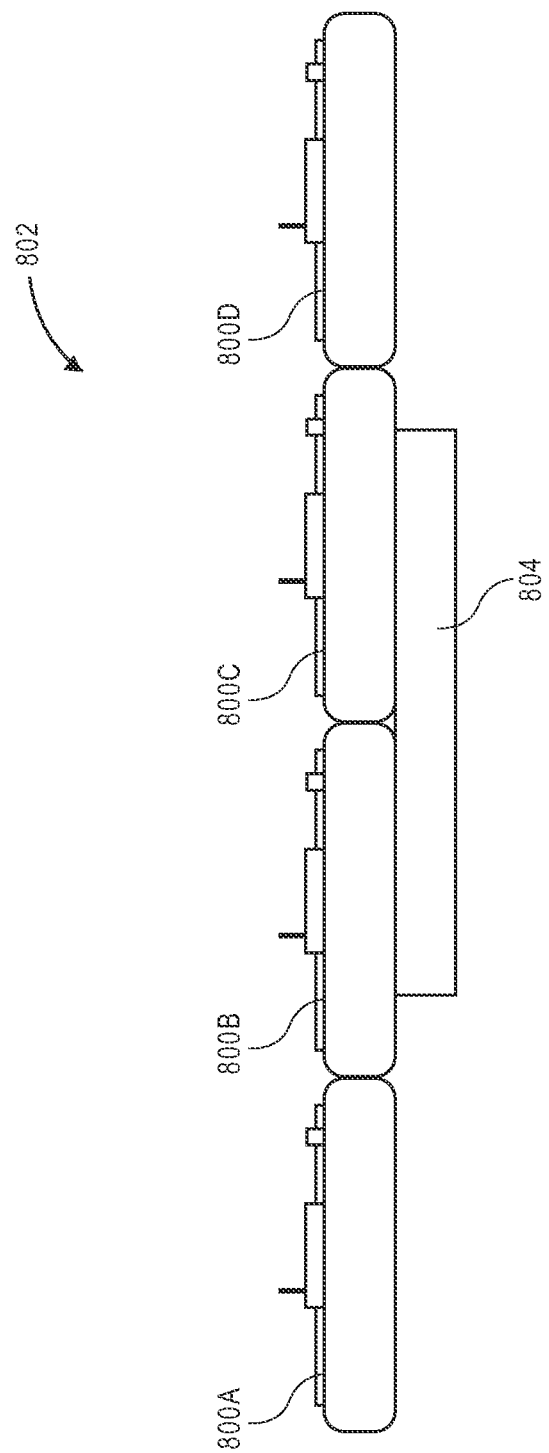
FIG. 8 depicts another side-view of a collective UAV configuration, according to an implementation.

FIG. 8 depicts another side-view of a collective UAV 802 configuration, according to an implementation. In this example, two of the UAVs 800B, 800C are coupled to a single payload 804 and two other UAVs 800A, 800D are coupled to UAVs 800B, 800C, but do not have any coupled payloads. In this example, the payload 804 is heavier than a single UAV can aerially transport, so two UAVs 800B, 800C are coupled to form a collective UAV that is coupled to the payload 804 to enable aerial transport of the payload 804. Likewise, the delivery destination is beyond the range that two coupled UAVs 800B, 800C can reach under their own power so two additional UAVs 800A, 800D are coupled with the UAVs 800B, 800C to form the collective UAV 802 to enable aerial transport of the payload 804. In such an example, the collective UAV may aerially navigate the payload to a delivery area. When the collective UAV 802 reaches the delivery area, the two UAVs 800B, 800C may decouple from the other two UAVs 800A, 800D to complete delivery of the payload 804 to a delivery destination. After the payload is delivered, the two UAVs 800B, 800C may recouple with the two UAVs 800A, 800D to aerially navigate together to another location.

Decoupling one or more of the UAVs from the collective UAV to complete delivery of the item improves the safety around the delivery destination and increases the agility of the UAV or collective UAV as it delivers the item to the delivery destination. For example, if there are numerous UAVs coupled to form a collective UAV, the collective UAV may be several feet wide. For example, referring again to FIG. 4, if each UAV 400 is approximately two feet wide by approximately two feet long, the collective UAV 402 will be approximately ten feet wide by approximately eight feet long. As another example, referring to FIG. 5, if each UAV 500 is approximately two feet wide by approximately two feet long, the collective UAV 502 will be approximately four feet wide by approximately four feet long by approximately four feet tall.

While the collective UAV configuration improves visibility and safety while the UAV is at high altitudes by making it more visible to other aircraft, such a large configuration may not be desirable at low altitudes during item delivery. For example, if a user has ordered an item and specified a location in the backyard of their home as the delivery destination, it may be dangerous to attempt to deliver the item with a collective UAV that is approximately ten feet wide by eight feet long. In contrast, delivery with a single UAV that is approximately two feet wide by two feet long may be much safer.

Figure 9:
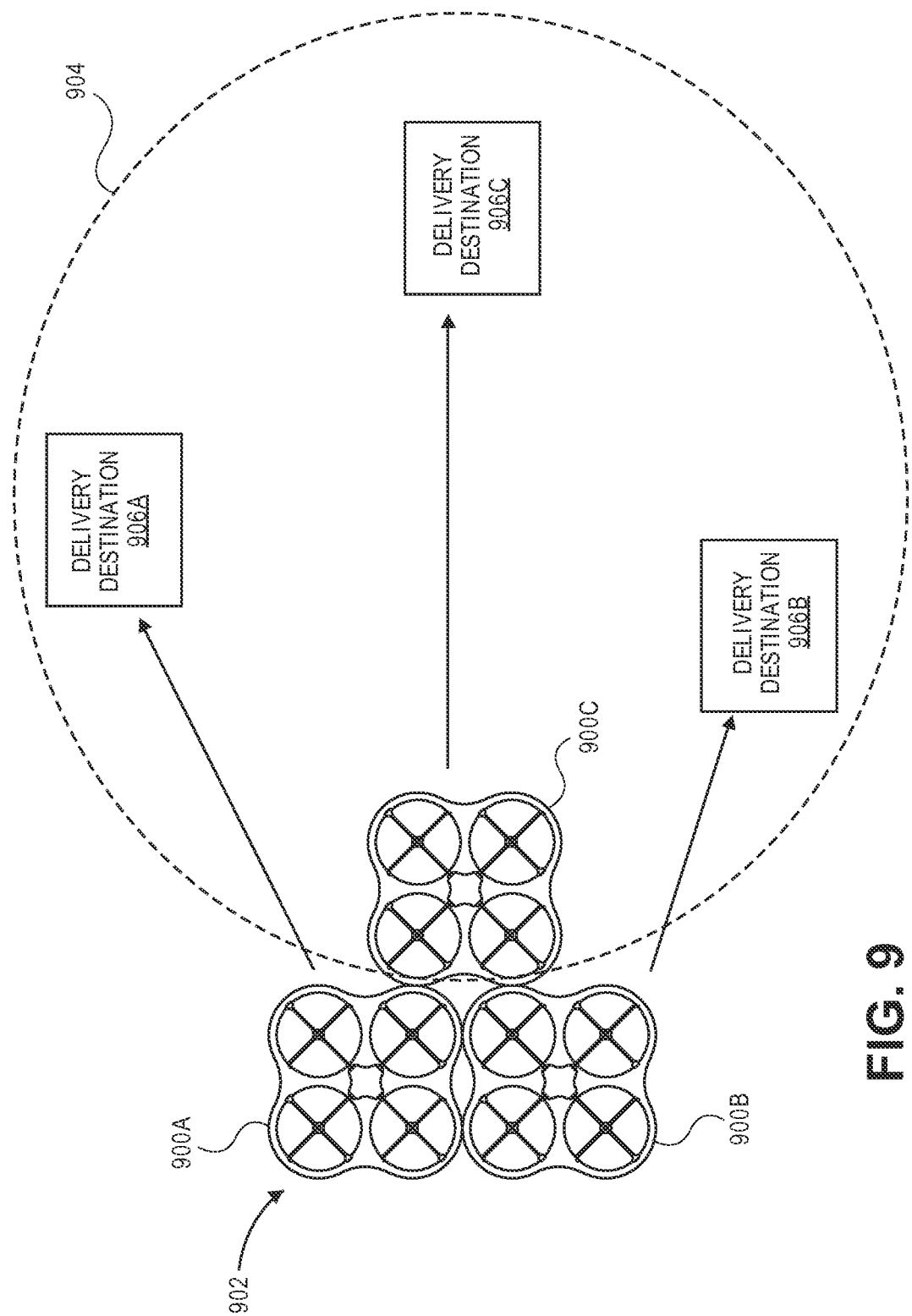
FIG. 9 depicts a top-down view of a collective UAV arriving at a delivery area, according to an implementation.

Continuing with the above examples, FIG. 9 depicts a top-down view of a collective UAV 902 arriving at a delivery area 904, according to an implementation. As the collective UAV 902 arrives at the delivery area 904, the UAVs 900A, 900B, 900C may decouple and complete delivery of payload carried by the UAV to a delivery destination 906. For example, UAV 900A may decouple from the collective UAV 902 and complete delivery of a payload to delivery destination 906A. UAV 900B may decouple from the collective UAV 902 and complete delivery of a payload to delivery destination 906B. Likewise, UAV 900C may decouple from the collective UAV and complete delivery of a payload to delivery destination 906C.

While this example shows all of the UAVs 900 of the collective UAV 902 decoupling from the collective UAV to deliver a payload to a delivery destination within the delivery area 904, in other implementations, one or more of the UAVs of the collective UAV 902 may not be delivering a payload to a delivery destination within the delivery area. For example, some UAVs of the collective UAV 902 may be aerially navigating past the delivery area 904 to a second delivery area to complete delivery of payloads to delivery destinations within that second delivery area. As another example, some of the UAVs of the collective UAV may only provide support for the aerial transport of the collective UAV and may not carry any payload for delivery. For example, some of the UAVs may carry as a payload additional power modules that may be utilized by the collective UAV to extend the flight duration and/or distance of the collective UAV. As another example, one of the UAVs may be configured as a master UAV of the collective UAV and be configured to aid in the aerial navigation of the collective UAV to the delivery area.

Figure 10:
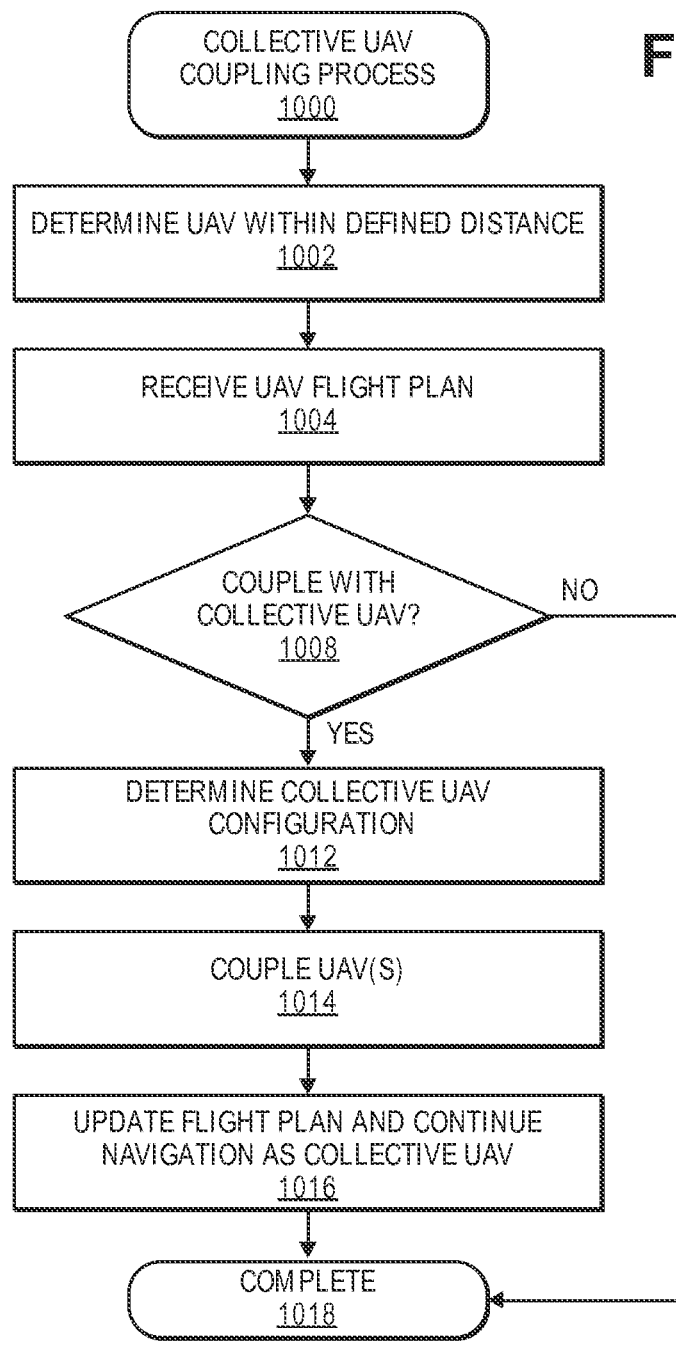
FIG. 10 is a flow diagram of an example collective UAV coupling process, according to an implementation.

FIG. 10 is a flow diagram of an example collective UAV coupling process 1000, according to an implementation. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

Figure 15:
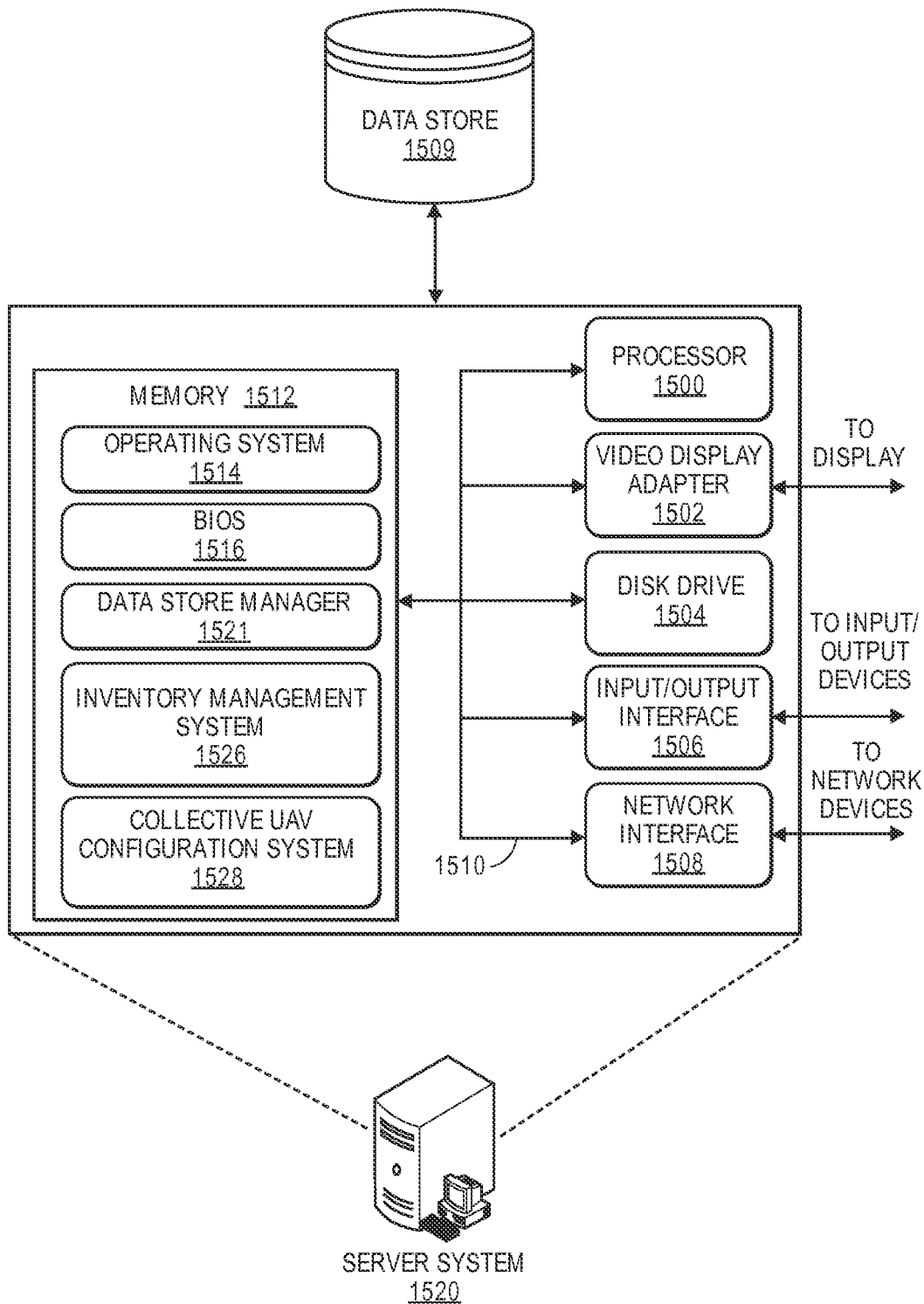
FIG. 15 is a block diagram of an illustrative implementation of a server system that may be used with various implementations.

The example process 1000 may be performed by a UAV, a collective UAV, and/or the collective UAV configuration system 1528 (FIG. 15). While the example discussed below with respect to FIG. 10 describes two UAVs, in other implementations, the example process may be used with a UAV and a collective UAV, or two collective UAVs.

The example process 1000 begins by determining a first UAV within a defined distance of a second UAV, as in 1002. The defined distance may be any defined distance between UAVs (e.g., one mile). Upon determination that the first UAV is within a defined distance of the second UAV, flight plans of the UAV(s) is received, as in 1004. For example, the two UAVs may each transmit flight plans. Alternatively, the collective UAV configuration system may periodically receive and/or determine flight plans for the UAVs.

Based on the flight plans, a determination is made as to whether the flight plans of the two UAVs are complementary and whether the two UAVs should be coupled to form a collective UAV, as in 1008. For example, if both flight plans are similar, in a similar direction, toward a similar destination (e.g., delivery area, materials handling facility), it may be determined that the flight plans of the two UAVs are complementary. Likewise, it may be determined that the UAVs should couple if they are both capable of coupling to one another, if there is sufficient distance remaining in their respective flight plans that coupling will be beneficial, etc. Other factors may also be considered in determining whether the UAVs should couple. For example, the net energy that will be saved by coupling the UAVs into a collective UAV may be estimated and considered, the increased visibility of the collective UAV may be considered, the lifting capacity of the collective UAV may be considered, etc.

If it is determined that either the flight plans are not complementary and/or that the two UAVs should not couple, the example process 1000 completes, as in 1018. However, if it is determined that the flight plans are complementary and that the UAVs should couple, a collective UAV configuration is determined, as in 1012. As discussed above, any collective UAV configuration may be determined.

Upon determining the collective UAV configuration, the first UAV and the second UAV couple to form a collective UAV according to the determined collective UAV configuration, as in 1014. The flight plans are also updated or a single flight plan for the collective UAV is determined based on the destinations of each UAV, as in 1016. For example, if the two UAVs are navigating to different destinations that are separated by a distance, a collective UAV flight plan may be determined that causes that collective UAV to aerially navigate to a point between the two destinations before the two UAVs decouple and complete navigation independently to the respective destinations. In some implementations, the point between the destinations may be a midpoint. In other implementations, the point between the destinations may be determined based on the location of the destinations, the power and navigation capabilities of the UAVs, the delivery time for the UAVs, etc. For example, a first UAV may have more power remaining than a second UAV so the flight plan may instruct the collective UAV to navigate toward the destination of the first UAV and for the second UAV to decouple at a point along the flight plan to complete navigation to the destination of the second UAV.

Figure 11:
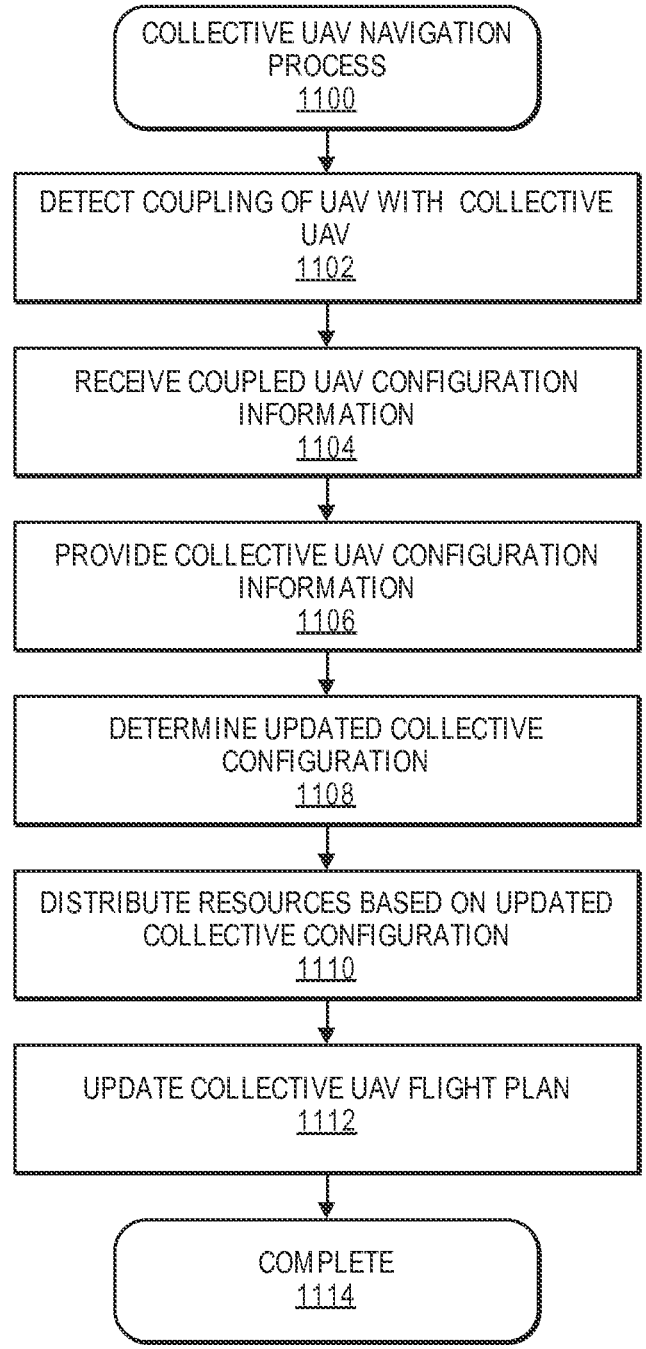
FIG. 11 is a flow diagram of an example collective UAV navigation process, according to an implementation.

FIG. 11 is a flow diagram of an example collective UAV navigation process 1100, according to an implementation.

The example process 1100 begins by detecting a coupling of a UAV with the collective UAV, as in 1102. As discussed above with respect to FIG. 10, a UAV may be instructed to couple with the collective UAV according to a collective UAV configuration. Once the UAV couples with the collective UAV, the coupling is detected by at least one other UAV of the collective UAV. For example, a first UAV of the collective UAV to which a second UAV couples may determine that the second UAV has coupled with the collective UAV.

Upon coupling, the UAV configuration information of the coupled UAV is received from the coupled UAV, as in 1104. The UAV configuration information may include a UAV identifier, navigation information, power supply capabilities, motor and propeller configuration, weight of the UAV and/or payload, the location of the UAV's sensors, etc. In addition to receiving UAV configuration information from the coupled UAV, the collective UAV configuration information may be provided to the coupled UAV, as in 1106. The collective UAV configuration information may identify, for example, the navigation information of the collective UAV, operating parameters, the configuration of the collective UAV, the sensor locations of sensors that are being used by the collective UAV, etc.

In addition to exchanging information, the configuration of the collective UAV may be updated to include the coupled UAV, as in 1108. In addition, a determination may be made as to whether any resources should be distributed or redistributed based on the addition of a UAV to the collective UAV, as in 1110. As discussed above, one or more resources (e.g., power, motors/propellers, control systems, etc.) may be shared among multiple UAVs of a collective UAV. In some implementations, UAVs on the perimeter of a collective UAV may operate their motors to provide the lifting force to aerially navigate the collective UAV. In such an implementation, the rotational speed of motors of internal UAVs and/or the internal motors of perimeter UAVs may be reduced or terminated to conserve power. Accordingly, when a UAV couples with a collective UAV, it may be determined whether resources are to be distributed or redistributed. For example, the UAV that coupled with the collective UAV may be instructed to continue rotating its motors and propellers to provide lift and another UAV may be instructed to reduce or terminate the rotation of its motors and corresponding propellers.

In addition to distributing or redistributing the resources of the collective UAV, the flight plan of the collective UAV is updated, as in 1112. For example, the heading of the collective UAV may be adjusted to account for the destination of the added UAV and/or may be adjusted based on the power capabilities of the added UAV. The example process 1100 then completes, as in 1114.

Figure 12:
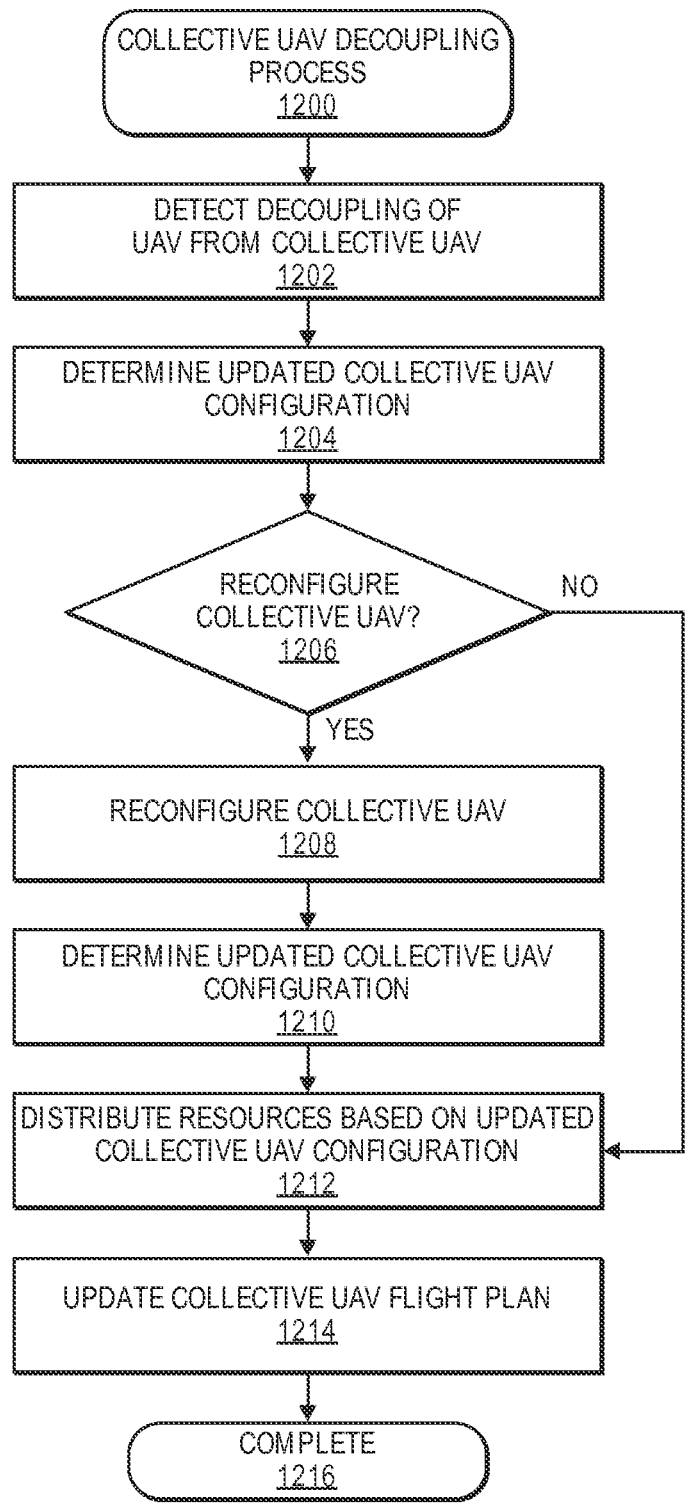
FIG. 12 is a flow diagram of a collective UAV decoupling process, according to an implementation.

FIG. 12 is a flow diagram of a collective UAV decoupling process 1200, according to an implementation. The example process 1200 begins when a decoupling of a UAV from the collective UAV is determined, as in 1202. As discussed above with respect to FIGS. 6 and 9, a UAV may decouple from the collective UAV to, for example, complete delivery of a payload to a delivery destination. Once the UAV decouples from the collective UAV, the decoupling is detected by at least one other UAV of the collective UAV. For example, a first UAV of the collective UAV from which a second UAV decoupled may determine that the second UAV has decoupled from the collective UAV. Likewise, the second UAV may provide a notification that it is decoupling from the collective UAV.

Upon decoupling, the updated collective UAV configuration is determined for the collective UAV, as in 1204. Based on the updated collective UAV configuration, a determination is made as to whether the collective UAV should reconfigure, as in 1206. For example, as discussed above with respect to FIG. 6, if the remaining UAVs of the collective UAV may be reconfigured in a manner that provides more efficiency, power savings, etc., it may be determined that the collective UAV is to be reconfigured.

If it is determined that the collective UAV is to reconfigure, instructions are sent to the UAV that remain part of the collective UAV to complete the reconfiguration of the collective UAV, as in 1208. Once the collective UAV is reconfigured, the updated collective UAV configuration is determined, as in 1210. After either reconfiguring the collective UAV or if it is determined that the collective UAV is not to be reconfigured (block 1206), the resources of the collective UAV are distributed and/or redistributed according to the updated UAV configuration, as in 1212. As discussed above, one or more resources (e.g., power, motors/propellers, control systems, etc.) may be shared among multiple UAVs of a collective UAV. In some implementations, UAVs on the perimeter of a collective UAV may operate their motors to provide the lifting force to aerially navigate the collective UAV. In such an implementation, the rotational speed of motors of internal UAVs and/or the internal motors of perimeter UAVs may be reduced or terminated to conserve power. Accordingly, when a UAV decouples from a collective UAV, it may be determined whether resources are to be distributed or redistributed. For example, if the UAV that decoupled from the collective UAV was on the perimeter and providing lifting force for the collective UAV, it may be determined that the resources of the collective UAV need to be redistributed so that a remaining UAV can assume the responsibility of rotating its motors and corresponding propellers to provide lifting force for the collective UAV.

In addition to distributing or redistributing the resources of the collective UAV, the flight plan of the collective UAV is updated, as in 1214. For example, the heading of the collective UAV may be adjusted to account for the decoupling of the UAV. The example process 1200 then completes, as in 1216.

Figure 13:
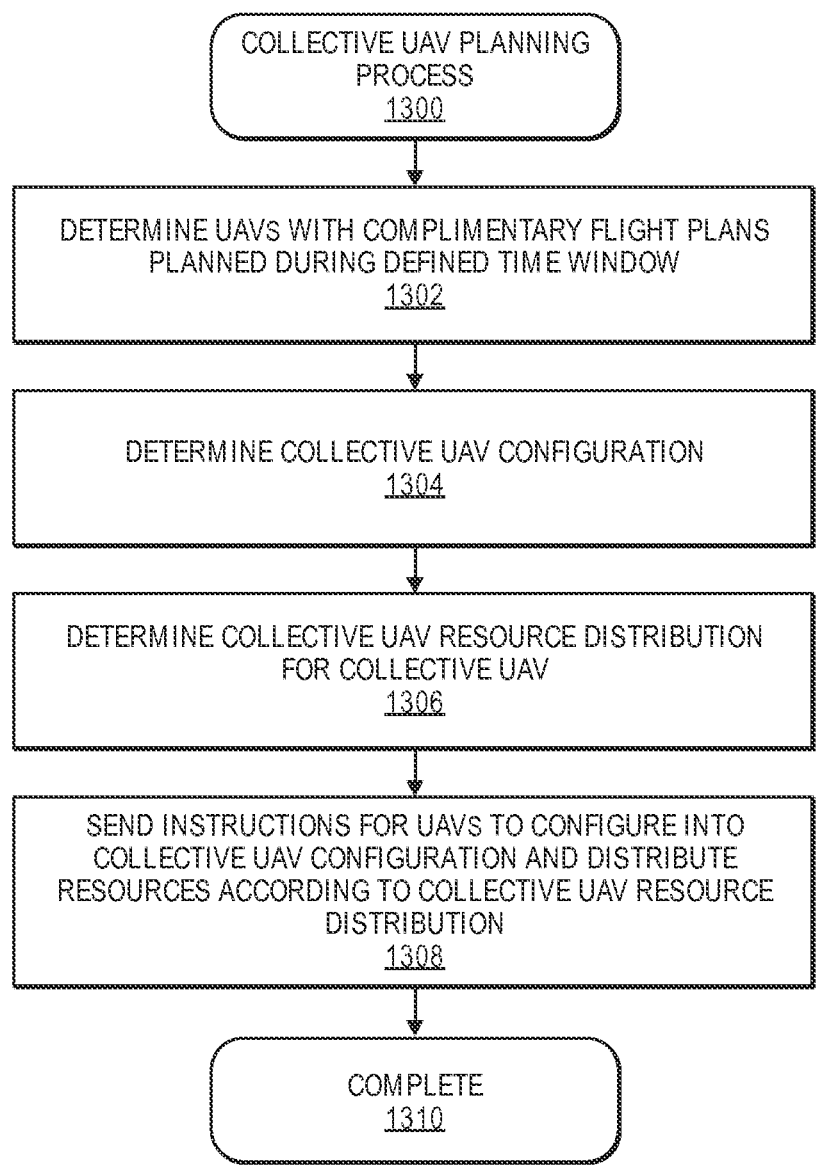
FIG. 13 is a flow diagram of a collective UAV planning process, according to an implementation.

FIG. 13 is a flow diagram of an example collective UAV planning process 1300, according to an implementation. The example collective UAV planning process 1300 may be performed by the collective UAV configuration system 1528. For example, the collective UAV configuration system 1528 may perform that collective UAV planning process while items are being packaged for delivery at a materials handling facility to determine a collective UAV that will aerially navigate from the materials handling facility to a delivery area.

The example process 1300 begins by determining UAVs that have or will have complementary flight plans during a defined time window, as in 1302. For example, items ordered by customers may each have similar delivery expectations and/or delivery times. Based on the delivery times, the distance between the materials handling facility from which the items will be transported and the speed of aerial transport, an approximate departure time can be determined for the UAVs that will transport the items. If the approximate departure time is within the defined time window and the flight plans are complementary, the UAVs may be selected for forming a collective UAV.

Based on the number of UAVs determined at block 1302, a collective UAV configuration is determined, as in 1304. The collective UAV configuration may specify the shape of the configuration and where in the collective UAV configuration each UAV is to be positioned. The positioning of the UAVs in the collective UAV configuration may be determined based on the power capabilities of the UAVs, the motors, propellers and/or lifting capabilities of the UAVs, the size of the UAVs, the payload weight of the UAVs, the location of the delivery destinations of the UAVs, etc. For example, UAVs that will decouple first from the collective UAV may be positioned on a perimeter of the collective UAV.

In addition to determining the collective UAV configuration, a collective UAV resource distribution is determined for the collective UAV, as in 1306. Similar to positioning of the UAVs in the collective UAV configuration, resource distribution may be determined based on, for example, the power capabilities of the UAVs, the motors, propellers and/or lifting capabilities of the UAVs, the size of the UAVs, the payload weight of the UAVs, the location of the delivery destinations of the UAVs, etc. For example, UAVs that will have excess power based on the distance to their delivery destination and/or payload weight, may be instructed to provide power to other UAVs of the collective UAV to enable operation of the collective UAV.

Based on the determined UAVs, determined collective UAV configuration, and determined resource distribution, instructions are sent to each UAV that is be included in the collective UAV to configure into the collective UAV and distribute resources according to the determined resource distribution, as in 1308. The instructions may be sent to the UAVs as the ordered items are packed and prepared for departure, as part of their navigation instructions, etc. Finally, the example process 1300 completes, as in 1310.

Figure 14:
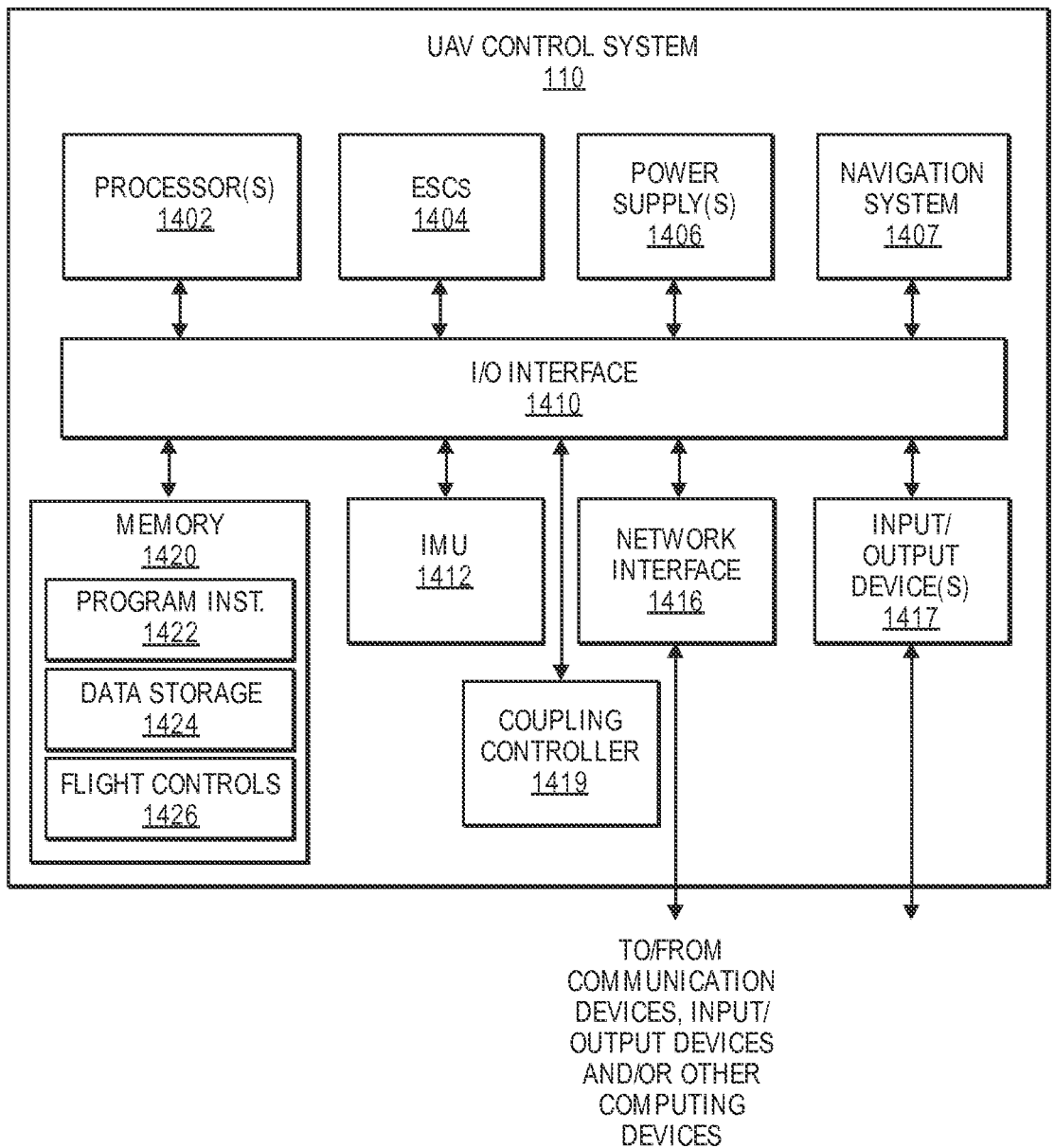
FIG. 14 is a block diagram of an illustrative implementation of a UAV control system that may be used with various implementations.

FIG. 14 is a block diagram illustrating an example UAV control system 110. In various examples, the block diagram may be illustrative of one or more aspects of the UAV control system 110 that may be used to implement the various systems and methods discussed herein and/or to control operation of the UAVs described herein. In the illustrated implementation, the UAV control system 110 includes one or more processors 1402, coupled to a memory, e.g., a non-transitory computer readable storage medium 1420, via an input/output (I/O) interface 1410. The UAV control system 110 may also include electronic speed controls 1404 (ESCs), power supply modules 1406, a navigation system 1407, and/or an inertial measurement unit (IMU) 1412. In some implementations, the IMU may be incorporated into the navigation system 1407. The UAV control system 110 may also include a coupling controller 1419 configured to control the coupling component(s) that is used to couple/decouple the UAV from other UAVs. The UAV control system 110 may also include a payload engagement controller (not shown), a network interface 1416, and one or more input/output devices 1417.

In various implementations, the UAV control system 110 may be a uniprocessor system including one processor 1402, or a multiprocessor system including several processors 1402 (e.g., two, four, eight, or another suitable number). The processor(s) 1402 may be any suitable processor capable of executing instructions. For example, in various implementations, the processor(s) 1402 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1402 may commonly, but not necessarily, implement the same ISA.

The non-transitory computer readable storage medium 1420 may be configured to store executable instructions, data, flight plans, flight control parameters, collective UAV configuration information, UAV configuration information, and/or data items accessible by the processor(s) 1402. In various implementations, the non-transitory computer readable storage medium 1420 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 1420 as program instructions 1422, data storage 1424 and flight controls 1426, respectively. In other implementations, program instructions, data, and/or flight controls may be received, sent, or stored upon different types of computer-accessible media, such as non-transitory media, or on similar media separate from the non-transitory computer readable storage medium 1420 or the UAV control system 110. Generally speaking, a non-transitory, computer readable storage medium may include storage media or memory media such as magnetic or optical media, e.g., disk or CD/DVD-ROM, coupled to the UAV control system 110 via the I/O interface 1410. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 1416.

In one implementation, the I/O interface 1410 may be configured to coordinate I/O traffic between the processor(s) 1402, the non-transitory computer readable storage medium 1420, and any peripheral devices, the network interface and/or other peripheral interfaces, such as input/output devices 1417. In some implementations, the I/O interface 1410 may perform any necessary protocol, timing or other data transformations to convert data signals from one component (e.g., non-transitory computer readable storage medium 1420) into a format suitable for use by another component (e.g., processor(s) 1402). In some implementations, the I/O interface 1410 may include support for devices attached through various types of peripheral buses, such as a variant of the Peripheral Component Interconnect (PCI) bus standard or the Universal Serial Bus (USB) standard, for example. In some implementations, the function of the I/O interface 1410 may be split into two or more separate components, such as a north bridge and a south bridge, for example. Also, in some implementations, some or all of the functionality of the I/O interface 1410, such as an interface to the non-transitory computer readable storage medium 1420, may be incorporated directly into the processor(s) 1402.

The ESCs 1404 communicate with the navigation system 1407 and/or the IMU 1412 and adjust the rotational speed of each lifting motor to stabilize the UAV and guide the UAV along a determined flight plan. The navigation system 1407 may include a GPS, indoor positioning system (IPS), IMU or other similar system and/or sensors that can be used to navigate the UAV 100 to and/or from a location. The payload engagement controller communicates with the actuator(s) or motor(s) (e.g., a servo motor) used to engage and/or disengage items.

The coupling controller 1419 communicates with the processor 1402 and/or other components and controls the coupling, data and/or resources sharing between the UAV and other coupled UAVs. For example, if the coupling component is an electromagnet, the coupling controller 1419 may be utilized to activate the electromagnet to couple the UAV with another UAV or deactivate the electromagnet to decouple the UAV from another UAV.

The network interface 1416 may be configured to allow data to be exchanged between the UAV control system 110, other devices attached to a network, such as other computer systems (e.g., remote computing resources), and/or with UAV control systems of other UAVs. For example, the network interface 1416 may enable communication between the UAV that includes the control system 110 and a UAV control system of another coupled UAV. In another example, the control system 110 may enable wireless communication between the UAV that includes the control system 110 and a UAV control system that is implemented on one or more remote computing resources. For wireless communication, an antenna of a UAV and/or other communication components may be utilized. As another example, the network interface 1416 may enable wireless or wired communication between numerous UAVs. For example, when UAVs are coupled, they may utilize a wired communication via the coupling components to communicate.

When UAVs are not coupled, they may utilize wireless communication to communicate. In various implementations, the network interface 1416 may support communication via wireless general data networks, such as a Wi-Fi, satellite, and/or cellular networks.

Input/output devices 1417 may, in some implementations, include one or more displays, imaging devices, thermal sensors, infrared sensors, time of flight sensors, accelerometers, pressure sensors, weather sensors, cameras, gimbals, landing gear, etc. Multiple input/output devices 1417 may be present and controlled by the UAV control system 110. One or more of these sensors may be utilized to assist in landing as well as to avoid obstacles during flight.

As shown in FIG. 14, the memory may include program instructions 1422, which may be configured to implement the example processes and/or sub-processes described herein. The data storage 1424 may include various data stores for maintaining data items that may be provided for determining flight plans, landing, identifying locations for disengaging items, engaging/disengaging the pushing motors, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV control system 110 is merely illustrative and is not intended to limit the scope of the present disclosure. In particular, the computing system and devices may include any combination of hardware or software that can perform the indicated functions. The UAV control system 110 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device, such as a UAV control system of a coupled UAV, and communicate with the illustrated UAV control system 110. Some or all of the system components or data structures may also be stored (e.g., as instructions or structured data) on a non-transitory, computer-accessible medium or a portable article to be read by an appropriate drive. In some implementations, instructions stored on a computer-accessible medium separate from the UAV control system 110 may be transmitted to the UAV control system 110 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other UAV control system configurations.

FIG. 15 is a pictorial diagram of an illustrative implementation of a server system 1520 that may be used in the implementations described herein. The server system 1520 may include a processor 1500, such as one or more redundant processors, a video display adapter 1502, a disk drive 1504, an input/output interface 1506, a network interface 1508, and a memory 1512. The processor 1500, the video display adapter 1502, the disk drive 1504, the input/output interface 1506, the network interface 1508, and/or the memory 1512 may be communicatively coupled to each other by a communication bus 1510.

The video display adapter 1502 provides display signals to a display (not shown in FIG. 15) permitting an agent of the server system 1520 to monitor and configure operation of the server system 1520 and/or to provide information (e.g., regarding collective configurations, navigation paths, etc.). The input/output interface 1506 likewise communicates with external input/output devices not shown in FIG. 15, such as a mouse, keyboard, scanner, or other input and output devices that can be operated by an agent of the server system 1520. The network interface 1508 includes hardware, software, or any combination thereof, to communicate with other computing devices. For example, the network interface 1508 may be configured to provide communications between the server system 1520 and other computing devices, such as that of a materials handling facility, delivery location, and/or UAV, via a network.

The memory 1512 generally comprises random access memory (RAM), read-only memory (ROM), flash memory, and/or other volatile or permanent memory. The memory 1512 is shown storing an operating system 1514 for controlling the operation of the server system 1520. A binary input/output system (BIOS) 1516 for controlling the low-level operation of the server system 1520 is also stored in the memory 1512.

The memory 1512 additionally stores program code and data for providing network services to UAVs, materials handling facilities, the inventory management system 1526, and/or the collective UAV configuration system 1528. The program instructions enable communication with a data store manager application 1521 to facilitate data exchange between the data store 1509, the inventory management system 1526 and/or the collective UAV configuration system 1528.

As used herein, the term "data store" refers to any device or combination of devices capable of storing, accessing, and retrieving data, which may include any combination and number of data servers, databases, data storage devices and data storage media, in any standard, distributed or clustered environment. The server system 1520 can include any appropriate hardware and software for integrating with the data store 1509 as needed to execute aspects of one or more applications for a collective UAV, materials handling facility, delivery location, collective UAV configuration system 1528, and/or the inventory management system 1526.

The data store 1509 can include several separate data tables, databases or other data storage mechanisms and media for storing data relating to a particular aspect. For example, the illustrated data store 1509 includes mechanisms for maintaining information related to operations, inventory, maps, GPS data, etc., which can be used to generate and deliver information to one or more UAVs, the inventory management system 1526, and/or the collective UAV configuration system 1528. It should be understood that there might be additional aspects that can be stored in the data store 1509 and that additional data stores beyond the one illustrated may be included. For example the data store 1509 may maintain collective UAV configurations and information relating to efficiency, flight duration, etc., of UAVs when coupled according to each collective UAV configuration. The data store 1509 is operable, through logic associated therewith, to receive instructions from the server system 1520 and obtain, update or otherwise process data in response thereto.

The memory 1512 may also include the inventory management system 1526, discussed above. The inventory management system 1526 may be executable by the processor 1500 to implement one or more of the functions of the server system 1520. In one implementation, the inventory management system 1526 may represent instructions embodied in one or more software programs stored in the memory 1512. In another implementation, the inventory management system 1526 can represent hardware, software instructions, or a combination thereof.

The memory 1512 may also include the collective UAV configuration system 1528, discussed above. The collective UAV configuration system 1528 may be executable by the processor 1500 to implement one or more of the functions of the server system 1520. In one implementation, the collective UAV configuration system 1528 may represent instructions embodied in one or more software programs stored in the memory 1512. In another implementation, the collective UAV configuration system 1528 can represent hardware, software instructions, or a combination thereof.

The server system 1520, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction in FIG. 15 should be taken as being illustrative in nature and not limiting to the scope of the disclosure.

Those skilled in the art will appreciate that in some implementations the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. The various methods, systems, and processes as illustrated in the figures and described herein represent example implementations. The methods, systems, and processes may be implemented in software, hardware, or a combination thereof in other implementations. Similarly, the order of any process may be changed and various elements may be added, reordered, combined, omitted, modified, etc., in other implementations.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A collective unmanned aerial vehicle ("UAV") apparatus, comprising:
   a first UAV, including:
      a first motor and a second motor;
      a first propeller coupled to the first motor;
      a second propeller coupled to the second motor;
      a first UAV control system configured to provide first rotational speed instructions to each of the first motor and the second motor;
      a first power module configured to provide power to at least one of the first UAV control system, the first motor, or the second motor;
      a first connection component configured to connect the first UAV with a second UAV; and
      a first payload engagement mechanism operable to selectively engage and disengage a first payload;
   the second UAV removably coupled to the first UAV, including:
      a third motor and a fourth motor;
      a third propeller coupled to the third motor;
      a fourth propeller coupled to the fourth motor;
      a second connection component configured to couple the second UAV with the first UAV;
      a second power module configured to provide power to at least one of a second UAV control system, the third motor, or the fourth motor;
      a second payload engagement mechanism operable to engage the first payload while the first payload is also engaged by the first UAV to enable aerial transport of the first payload by the collective UAV apparatus; and
      the second UAV control system configured to provide second rotational speed instructions to each of the third motor and the fourth motor, wherein the second UAV control system is further configured to at least:
         receive first UAV configuration information from the first UAV;
         determine a collective UAV configuration based at least in part on the first UAV configuration and a second UAV configuration for the second UAV;
         determine a rotational speed for the third motor, wherein the rotational speed is determined based at least in part on the collective UAV configuration; and
         send a third rotational speed instruction to the third motor to adjust a rotational speed of the third motor.

2. The collective UAV apparatus of claim 1, wherein the third rotational speed instruction is an instruction for the third motor to stop a rotation of the third propeller.

3. The collective UAV apparatus of claim 1, wherein the first connection component of the first UAV is coupled to the second connection component of the second UAV.

4. The collective UAV apparatus of claim 3, wherein at least one of data or power may be exchanged between the first UAV and the second UAV between the first connection component and the second connection component.

5. The collective UAV apparatus of claim 1, wherein the first connection component and the second connection component provide at least one of an electrical coupling between the first UAV and the second UAV, a mechanical coupling between the first UAV and the second UAV, an electromechanical coupling between the first UAV and the second UAV, a magnetic coupling between the first UAV and the second UAV, or an optical coupling between the first UAV and the second UAV.

6. The collective UAV apparatus of claim 1, wherein the first UAV control system is further configured to at least:
   determine a resource distribution for distributing resources between the first UAV and the second UAV while coupled.

7. The collective UAV apparatus of claim 6, wherein the resources include at least one of: a power module, a computing component, a navigation component, a camera, a motor, or a control system.

8. A collective unmanned aerial vehicle ("UAV") apparatus, comprising:
   a first UAV, including:
      a first UAV control system configured to provide first rotational speed instructions to at least one motor of the first UAV;
      a first connection component configured to connect the first UAV with a second UAV; and
      a first payload engagement mechanism operable to selectively engage and disengage a first payload;
   the second UAV removably coupled to the first UAV, including:
      a second connection component configured to couple the second UAV with the first UAV;
      a second payload engagement mechanism operable to engage the first payload while the first payload is also engaged by the first UAV to enable aerial transport of the first payload by the collective UAV apparatus; and
      a second UAV control system configured to provide second rotational speed instructions to at least one motor of the second UAV, wherein the second UAV control system is further configured to at least:
         receive first UAV configuration information from the first UAV;
         determine a collective UAV configuration based at least in part on the first UAV configuration and a second UAV configuration for the second UAV;
         determine a rotational speed for the at least one motor of the second UAV, wherein the rotational speed is determined based at least in part on the collective UAV configuration; and
         send the second rotational speed instruction to the at least one motor of the second UAV to adjust a rotational speed of the at least one motor of the second UAV.

9. The collective UAV apparatus of claim 8, wherein the second rotational speed instructions include an instruction to stop a rotation of the at least one motor of the second UAV.

10. The collective UAV apparatus of claim 8, wherein the first connection component of the first UAV is coupled to the second connection component of the second UAV.

11. The collective UAV apparatus of claim 8, wherein at least one of data or power may be exchanged between the first UAV and the second UAV between the first connection component and the second connection component.

12. The collective UAV apparatus of claim 11, wherein the first connection component and the second connection component provide at least one of an electrical coupling between the first UAV and the second UAV, a mechanical coupling between the first UAV and the second UAV, an electromechanical coupling between the first UAV and the second UAV, a magnetic coupling between the first UAV and the second UAV, or an optical coupling between the first UAV and the second UAV.

13. The collective UAV apparatus of claim 8, wherein the first UAV further includes:
   a first motor and a second motor;
   a first propeller coupled to the first motor;
   a second propeller coupled to the second motor; and
   a first power module configured to provide power to at least one of the first UAV control system, the first motor, or the second motor.

14. The collective UAV apparatus of claim 8,
   wherein the second payload engagement mechanism is further operable to selectively engage and disengage a second payload to enable aerial transport of the second payload by the collective UAV apparatus.

15. The collective UAV apparatus of claim 8, wherein the first UAV control system is further configured to at least:
   determine a resource distribution for distributing at least one resource between the first UAV and the second UAV while coupled.

16. The collective UAV apparatus of claim 15, wherein the at least one resource includes at least one of: a power module, a computing component, a navigation component, a camera, a motor, or a control system.

17. A system, comprising:
   a first aerial vehicle, including:
      a first control system configured to provide a first instruction to a first motor of the first aerial vehicle;
      a first connection component configured to connect the first aerial vehicle with a second aerial vehicle; and
      a first payload engagement mechanism operable to selectively engage and disengage a first payload;
   the second aerial vehicle, including:
      a second connection component configured to couple the second aerial vehicle with the first aerial vehicle;
      a second payload engagement mechanism operable to engage the first payload while the first payload is also engaged by the first aerial vehicle to enable aerial transport of the first payload; and
      a second control system configured to provide a second instruction to a second motor of the second aerial vehicle, wherein the second control system is further configured to at least:
         receive first aerial vehicle configuration information regarding the first aerial vehicle;
         determine a collective aerial vehicle configuration based at least in part on the first aerial vehicle configuration and a second aerial vehicle configuration for the second aerial vehicle;
         determine the second instruction for the second motor of the second aerial vehicle, wherein the second instruction is determined based at least in part on the collective aerial vehicle configuration; and send the second instruction to the second motor of the second aerial vehicle.

18. The system of claim 17, wherein the second instruction is an instruction to stop the second motor of the second aerial vehicle.

19. The system of claim 17, wherein the first connection component of the first aerial vehicle is coupled to the second connection component of the second aerial vehicle.

20. The system of claim 17, wherein at least one of data or power may be exchanged between the first aerial vehicle and the second aerial vehicle while connected.

21. The system of claim 17, wherein the first control system is further configured to at least:

determine a resource distribution for distributing resources between the first aerial vehicle and the second aerial vehicle while coupled.

\* \* \* \* \*